United States Patent
Edler Von Koch

(10) Patent No.: US 9,851,959 B2
(45) Date of Patent: Dec. 26, 2017

(54) SEMANTICALLY SENSITIVE CODE REGION FINGERPRINT CALCULATION FOR PROGRAMMING LANGUAGES

(71) Applicant: Qualcomm Innovation Center, Inc., San Diego, CA (US)

(72) Inventor: Tobias Edler Von Koch, Austin, TX (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 1 day.

(21) Appl. No.: 15/243,516

(22) Filed: Aug. 22, 2016

(65) Prior Publication Data

US 2017/0235556 A1  Aug. 17, 2017

Related U.S. Application Data

(60) Provisional application No. 62/296,172, filed on Feb. 17, 2016.

(51) Int. Cl.
G06F 9/45 (2006.01)

(52) U.S. Cl.
CPC .................................. G06F 8/443 (2013.01)

(58) Field of Classification Search
CPC ....................................................... G06F 8/443
USPC ................................................... 717/159, 152
See application file for complete search history.

(56) References Cited

U.S. PATENT DOCUMENTS

| | | | | |
|---|---|---|---|---|
| 6,070,009 A * | 5/2000 | Dean | ................... | G06F 11/3466 714/E11.2 |
| 6,591,415 B1 * | 7/2003 | Torrubia-Saez | ........ | G06F 21/10 717/158 |
| 7,987,458 B2 * | 7/2011 | Rothman | .............. | G06F 9/4403 717/140 |
| 8,645,934 B2 * | 2/2014 | Fontenot | ................... | G06F 8/47 717/140 |
| 8,694,973 B2 * | 4/2014 | Beale | ................... | G06F 9/45516 712/229 |
| 8,825,689 B2 * | 9/2014 | Fedorenko | ................ | G06F 8/71 707/758 |
| 9,459,861 B1 * | 10/2016 | Rogers | ..................... | G06F 8/751 |
| 9,495,138 B1 * | 11/2016 | Frazier | ..................... | G06F 8/443 |
| 9,715,377 B1 * | 7/2017 | Bradbury | ................. | G06F 8/443 |
| 2006/0048118 A1 * | 3/2006 | Archambault | ........... | G06F 8/443 717/151 |
| 2017/0168791 A1 * | 6/2017 | Nay | .......................... | G06F 8/47 |

* cited by examiner

*Primary Examiner* — Qing Chen
*Assistant Examiner* — Clint Thatcher
(74) *Attorney, Agent, or Firm* — Neugeboren O'Dowd PC

(57) ABSTRACT

Herein disclosed is an optimization for a compiler, the optimization configured to assign numeric values, or semantic fingerprints, to portions of code, and to combine these fingerprints to arrive at fingerprints for larger and larger portions of code. The fingerprints can be provided to various consumers such as code redundancy optimization modules and copyright violation and malware/virus identification modules. The fingerprints can also be used to cluster similar code, and then code within each cluster can be merged. Merger can include creating a single merged portion of code including the same portions of code from the original portions of code plus control flow and new arguments to account for differences between the original portions of code. The original portions of code can be replaced with wrappers that use new arguments to call to the merged portion of code.

18 Claims, 23 Drawing Sheets

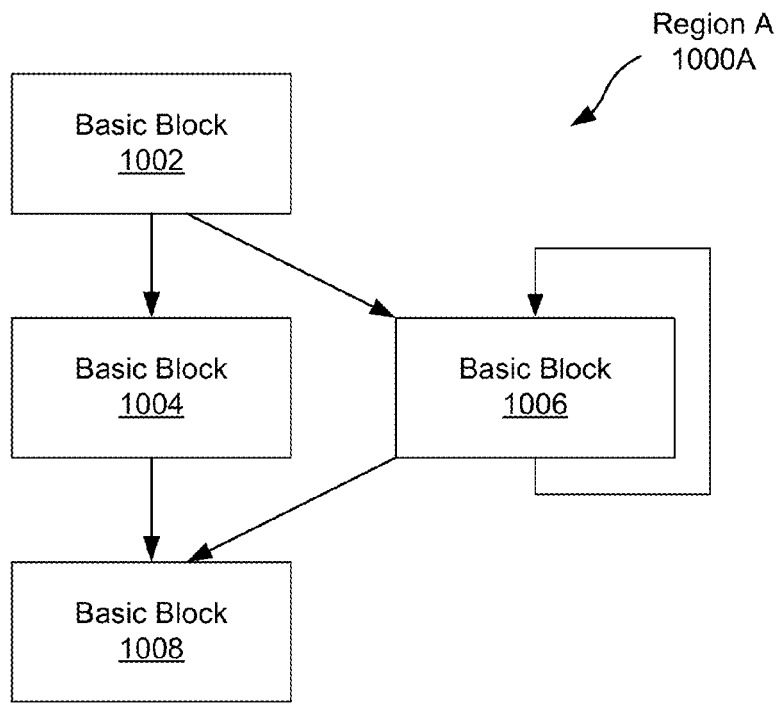
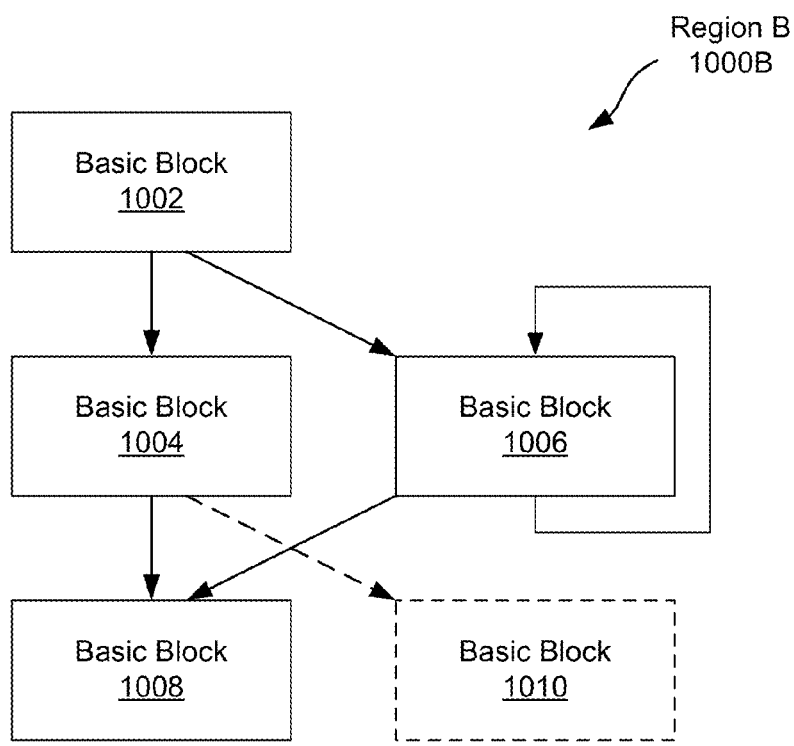
FIG. 10

Example 1 - Full Semantic equivalence

| C source code | LLVM IR representation | Semantic representation |
|---|---|---|
| `int foo (int a, int b, int c) {`<br>`  return c * (a + b);`<br>`}`<br><br>`int bar (int x, int y, int z) {`<br>`  return z * x + z * y;`<br>`}` | `; Function Attrs: nounwind readnone`<br>`define i32 @foo(i32 %a, i32 %b, i32 %c) #0 {`<br>`entry:`<br>`  %add = add nsw i32 %b, %a`<br>`  %mul = mul nsw i32 %add, %c`<br>`  ret i32 %mul`<br>`}`<br><br>`; Function Attrs: nounwind readnone`<br>`define i32 @bar(i32 %x, i32 %y, i32 %z) #0 {`<br>`entry:`<br>`  %mul13 = add i32 %y, %x`<br>`  %add = mul nsw i32 %mul13, %z`<br>`  ret i32 %add`<br>`}` | 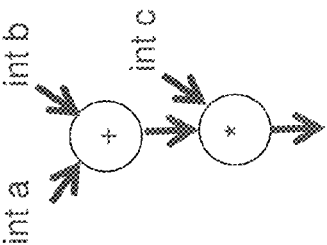 |

Semantic_hash(foo()) == Semantic_hash(bar())
Semantic_hash(foo()) - Semantic_hash(bar()) = 0

FIG. 13

Example 2 – Argument order difference

| C source code | LLVM IR representation | Semantic representation |
|---|---|---|

C source code:

int foo_1 (int a, int b, int c) {
  return c * (a + b);
} int bar_1 (int x, int y, int z) {
  return x * y + x * z;
}

LLVM IR representation:

; Function Attrs: nounwind readnone
define i32 @foo_1(i32 %a, i32 %b, i32 %c) #0 {
entry:
  %add = add nsw i32 %b, %a
  %mul = mul nsw i32 %add, %c
  ret i32 %mul
}

; Function Attrs: nounwind readnone
define i32 @bar_1(i32 %x, i32 %y, i32 %z) #0 {
entry:
  %mul13 = add i32 %z, %y
  %add = mul nsw i32 %mul13, %x
  ret i32 %add
}

Semantic representation: (foo: int a, int b → +, int c → *, → int foo); (bar: int z, int y → +, int x → *, → int bar)

Semantic_hash(foo()) != Semantic_hash(bar())
Semantic_hash(foo()) - Semantic_hash(bar()) = argument_order_diff
Where *argument_order_diff* is a very small numeric value != 0
Also note that the order of incoming values for an individual BB or a region other than a function makes no difference

FIG. 14

Example 1: Similar Functions

```
1  OP *Perl_scalarkids(pTHX_ OP *o) {
2      OP *kid;
3      if (o && o->op_flags & OPf_KIDS) {
4          for (kid = cLISTOPo->op_first; kid; kid = kid->op_sibling)
5              scalar(kid);
6      }
7      return o;
8  }
```

```
1  OP *Perl_listkids(pTHX_ OP *o) {
2      OP *kid;
3      if (o && o->op_flags & OPf_KIDS) {
4          for (kid = cLISTOPo->op_first; kid; kid = kid->op_sibling)
5              list(kid);
6      }
7      return o;
8  }
```

FIG. 19

Example 2: Functions and Their Semantic Fingerprints

Function Perl_scalarkids
Hash Value: 125

Function Perl_otherfn1
Hash Value: 2839

Function Perl_otherfn3
Hash Value: 2840

Function Perl_listkids
Hash Value: 127

Function Perl_otherfn2
Hash Value: 2838

Function Perl_otherfn4
Hash Value: 20

FIG. 20

Example 4: Merging of Functions

*Merged function with inserted control flow and additional argument to account for differences in original functions*

```
OP*MergedFunction(pTHX_OP*o, int Selector) {
  OP*kid;
  if(o && o->op_flags & Opf_KIDS){
    for(kid=cLISTOPo->op_first; kid; kid=kid->op_si}
      if(Selector)
        scalar(kid);
      else
        list(kid);
  }
  return o;
}
```
2202

*Original functions converted to wrappers calling merged function*

```
OP*Perl_scalarkids(pTHX_OP*o) {
  return MergedFunction(o,1);
}
```
2204

```
OP*Perl_listkids(pTHX_OP*o) {
  return MergedFunction(o,2);
}
```
2206

FIG. 22

SEMANTICALLY SENSITIVE CODE REGION FINGERPRINT CALCULATION FOR PROGRAMMING LANGUAGES

CLAIM OF PRIORITY UNDER 35 U.S.C. §119

The present application for patent claims priority to Provisional Application No. 62/296,172 entitled "Semantically Sensitive Code Region Hash Calculation for Programming Languages" filed Feb. 17, 2016, and assigned to the assignee hereof and hereby expressly incorporated by reference herein.

BACKGROUND

Field

The present disclosed embodiments relate generally to compiling programs of high-level languages, and more specifically to compile-time operations of high-level languages.

Background

A large number of embedded processors are deployed in cost-sensitive, but high-volume markets where even modest savings of unit cost can lead to a substantial overall cost reduction. Embedded processors typically use a systems-on-chip (SoC) architecture, where a plurality of processors are arranged with other components such as memories and peripherals on a single SoC. Memory typically occupies the largest portion of an SoC, and hence contributes most to the overall cost. Memory has to be large enough to store a full image of executable code (or the binary executable). As a consequence, any reduction in code size translates directly to equivalent savings of die area and, eventually, unit cost.

Computer software is often written using coding languages that are interpretable to humans, but not to machines. These high level languages include C, C++, Fortran, and Java, to name just a few. In order to run such "high level" programming languages (e.g., c=sum(a+b)), a compiler translates the source code into assembly code (e.g., LOAD A 134 DIV SAVE C 101 STOP), a low-level language whose commands have a 1:1 correspondence to the machine instructions understood by the computing device hardware, and finally to binary machine code (e.g., 100100 100010101 100100111111), which is directly readable by the computing device hardware. Then, when a user runs the software on the computing device, the operating system reads the machine code and executes it on the computing device hardware.

Large source codes often contain duplicates of blocks of code or near duplicates that results in bloated machine code (increased code size), and poor instruction cache hit rates. Duplicate code can be caused by copying and pasting of code by software developers; use of certain programming techniques (e.g., C macros); and may be caused as an artifact of language implementations (e.g. C++ templates). Bloated machine code can unnecessarily tax memory resources, while poor cache hit rates can degrade performance. Thus, various optimizations have been added to compilers to reduce duplicate or near duplicate instances of code during the compilation process to assembly.

For many optimizations during code compilation of an application expressed in a high level programming language (e.g., C, C++, Fortran, Java) a quick similarity assessment between large code fragments is desired. However, detecting near-duplicate blocks of code as well as removing duplicated and near-duplicated code, is non-trivial. A full comparison is most often prohibitively complex/slow, and historically it has proven to be extremely hard to solve the semantic comparison problem, especially in a reasonable amount of time. Simple string matching cannot be used to detect near duplicates, so an algorithm would essentially have to compare every code block to every other code block, statement by statement, to identify duplicates or near-duplicates. De-duplication is equally non-trivial since duplicated code needs to be extracted from locally modified code without changing the meaning of the program (program semantics).

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One aspect of the disclosure can be described as a non-transitory, tangible computer readable storage medium, encoded with processor readable instructions to perform a method for reducing duplicated code during compiling of source code. The method can include receiving a plurality of fingerprints each associated with one of a plurality of segments of an intermediate representation of the source code. The method can further include grouping the plurality of segments of the intermediate representation into clusters based on a similarity of the fingerprints such that each cluster comprises segments of the intermediate representation that are substantially the same. The method can also include for each cluster, recording a new merged function to memory, the merged function including code that is the same among all segments of the intermediate representation for a given cluster. The method can yet further include inserting control flow and new arguments into the new merged function to handle differences between the segments of the intermediate representation in the given cluster. The method can also include replacing the segments of the intermediate representation for the given cluster with wrappers that call the new merged function using the new arguments to each select a path through the control flow of the new merged function that achieves a same functionality as each segment of the intermediate representation would have achieved before being replaced by one of the wrappers.

Another aspect of the disclosure can be described as a system having a processing portion, a memory, and a compiler. The processing portion can have one or more processing components. The memory can be coupled to the processing portion and can be configured to store source code and a corresponding executable code. The compiler can be stored on the memory and can be executable on the processing portion. The compiler can be executable to receive a plurality of fingerprints each associated with one of a plurality of segments of an intermediate representation of the source code. The compiler can be executable to group the plurality of segments of the intermediate representation into clusters based on a similarity of the fingerprints such that each cluster comprises segments of the intermediate representation are clustered together. The compiler can be executable to, for each cluster, record a new merged function to memory, the merged function including code that is the same among all segments of the intermediate representation for a given cluster. The compiler can be executable to insert control flow and new arguments into the new merged function to handle differences between the segments of the intermediate representation in the given cluster. The compiler can be executable to replace the segments of the intermediate representation for the given cluster with wrappers that call the new merged function using the new arguments to each select a path through the control flow of the new merged function that achieves a same functionality as each segment of the intermediate representation would have achieved before being replaced by one of the wrappers.

Another aspect of the disclosure can be described as a system having a processing portion, a memory, a compiler, and various means for transforming source code to executable code. The processing portion can have one or more processing components therein. The memory can be coupled to the processing portion and can be configured to store source code and corresponding executable code. The compiler can be stored on the memory can include means for receiving a plurality of fingerprints each associated with one of a plurality of segments of an intermediate representation of the source code. The compiler can also include means for grouping the plurality of segments of the intermediate representation into clusters based on a similarity of the fingerprints such that each cluster comprises segments of the intermediate representation are clustered together. The compiler can further include means for recording a new merged function to memory for each cluster, the merged function including code that is the same among all segments of the intermediate representation for a given cluster. The compiler can yet further include means for inserting control flow and new arguments into the new merged function to handle differences between the segments of the intermediate representation in the given cluster. Also, the compiler can include means for replacing the segments of the intermediate representation for the given cluster with wrappers that call the new merged function using the new arguments to each select a path through the control flow of the new merged function that achieves a same functionality as each segment of the intermediate representation would have achieved before being replaced by one of the wrappers.

Yet a further aspect of the disclosure can be described a method. The method can include receiving a plurality of fingerprints each associated with one of a plurality of segments of an intermediate representation of the source code. The method can also include grouping the plurality of segments of the intermediate representation into clusters based on a similarity of the fingerprints such that each cluster comprises segments of the intermediate representation are clustered together. The method can also include for each cluster, recording a new merged function to memory, the merged function including code that is the same among all segments of the intermediate representation for a given cluster. The method can also include inserting control flow and new arguments into the new merged function to handle differences between the segments of the intermediate representation in the given cluster. The method can also include replacing the segments of the intermediate representation for the given cluster with wrappers that call the new merged function using the new arguments to each select a path through the control flow of the new merged function that achieves a same functionality as each segment of the intermediate representation would have achieved before being replaced by one of the wrappers.

BRIEF DESCRIPTION OF THE DRAWINGS

FIG. 10 illustrates a block diagram of control flow graphs for two different regions of code, Region A and Region B;

FIG. 13 depicts an example of full semantic equivalence between basic blocks;

FIG. 14 depicts an example of argument order difference between basic blocks;

FIG. 19 illustrates an example of two similar functions;

FIG. 20 illustrates an example of some functions along with illustrative semantic fingerprints for each function;

FIG. 22 illustrates an example of a merged function and the wrappers formed from the example illustrated in FIG. 19.

DETAILED DESCRIPTION

Figure 1:
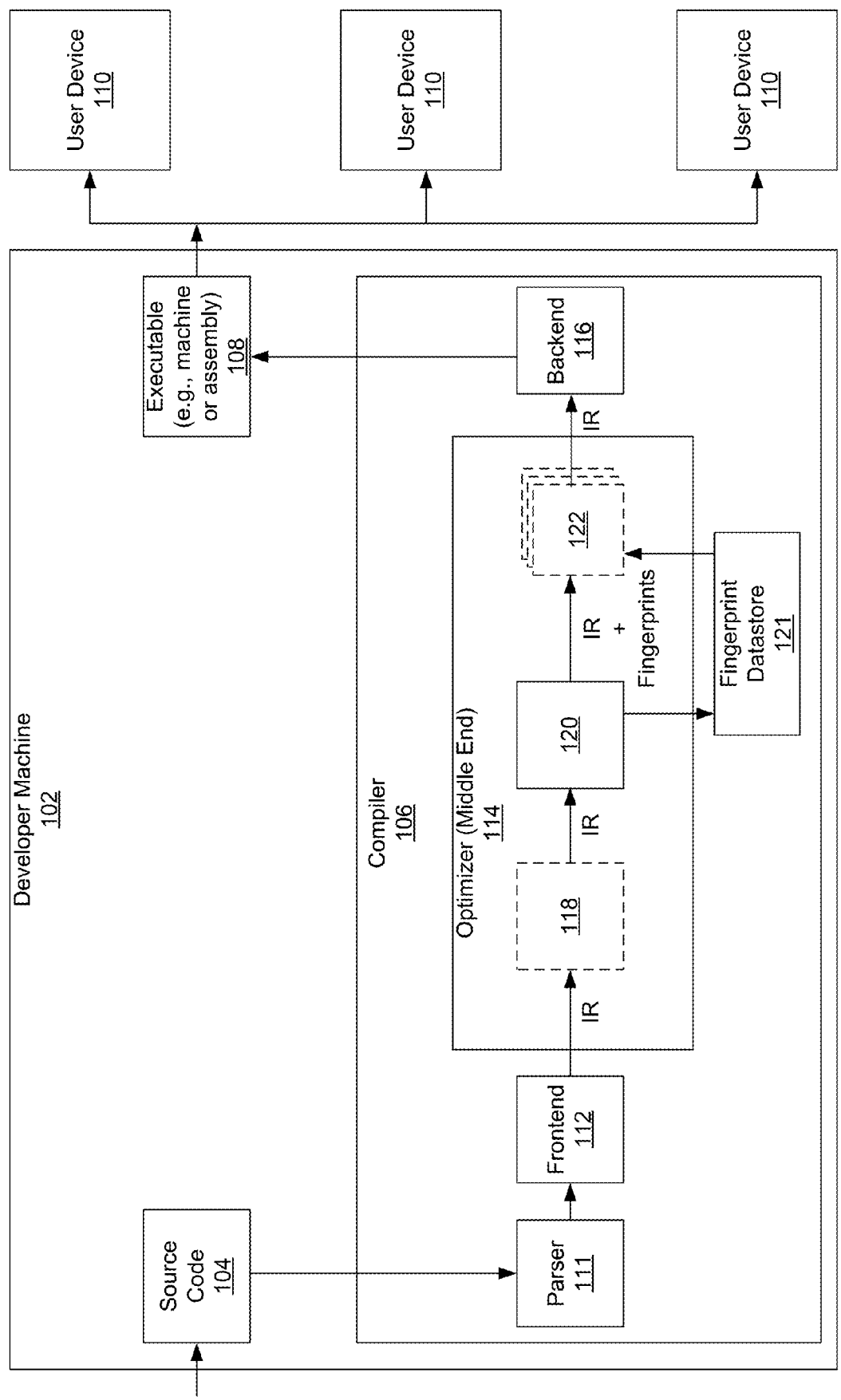
FIG. 1 illustrates a system for optimizing code to be executed on user devices.

As used herein, a "basic block" is a portion of code comprising a straight line sequence of instructions. In other words, a basic block includes a set of instructions where there are no points where execution diverges (e.g., diverges via an if-then statement or some other conditional statement).

As used herein, a "region" is a portion of code comprising two or more basic blocks and control flow that couples the basic blocks to each other as well as a number of exit points, where control flow leaves the region. More specifically, a region can encompass a number of different portions of code within a given program. For instance, a region can include a group of basic blocks that are strongly connected or a set of basic blocks having a single entry and a single exit. A region may include a set of basic blocks having a control flow loop, where the set of basic blocks has an entry and an exit, but where a conditional statement, such as an if-then statement, causes the control flow to loop back to the entry, or exit to another region, depending on the outcome of the conditional statement.

As used herein, a "function" is a portion of code comprising one or more regions and control flow that couples the regions to each other and that can be "called" or "invoked" from other parts of the program.

As used herein, a "program" is code comprising one or more functions.

As used herein, "control flow" is used to mean the way that sections of code (e.g., basic blocks, regions, functions, etc.) are linked. For instance, the way that an exit or output of a basic block links to an input or entry of another basic block is part of the control flow for a region encompassing these two basic blocks.

Prior art optimizations for code compilation either look for identical code equivalence or similar code, but only where the similar code comprises a same number of instructions per basic block and equivalent control flow. The inventor recognized that a more lenient approach to comparison could allow comparison of a greater number of code segments and thus greater merger of similar codes (likely resulting in better cache behavior). The result is increased code reduction and optimization than is possible in the art.

As disclosed herein, a single (condensed) metric (called a "semantic fingerprint") can be stored and reused repetitively with almost no overhead for comparison. The goal of the analysis is to reduce the meaning (semantics) of large fragments of code into a single, condensed metric that disregards syntactical differences and allows fast, approximate comparison of portions of code. In this way, code comparison is not limited to code having the same number of instructions and identical control flow. Said another way, an advantage of using semantic fingerprinting is that it is independent of the structural layout of the function. In the context of optimizing code via merging similar code, this enables merger of a broader range of similar code than was possible in the art.

Computing a numeric qualification (or approximate numerical value) of the semantic context (semantic fingerprint) in a short amount of time (linear to the code region size $O(N)$, where N=number of statements in the region) and comparing fingerprints in the same linear or even constant time ($O(1)$) is highly desirable. By "linear in the code region size" we mean that a small, constant number of operations is used for each statement in the region when computing the region fingerprint.

In the context of this disclosure, a semantic similarity between code segments means that two code segments can be expressed in different syntaxes, and have different metadata (e.g., DWARF debugging information), yet both are likely to produce identical/similar results given identical stimuli (e.g., input values).

The difference between two semantic fingerprint values (or "fingerprints") reflects the degree of similarity between two segments of code. Code segments can vary in size and composition from a single basic block (BB) to a whole function. A region of code comprises a sequence of basic blocks connected in a control flow graph (CFG), or connected by control flow, while a function comprises a sequence of regions connected by control flow.

The remainder of this application will use the terms "fingerprint" and "semantic fingerprint" interchangeably.

FIG. 1 illustrates a system for optimizing code to be executed on user devices. A developer machine 102 can include a compiler 106 residing in a memory of the developer machine 102 and executable on a processor of the developer machine 102 to compile source code 104 and generate executable code 108 (e.g., machine or assembly code) therefrom. The executable 108 can then be provided to user devices 110 and run on the user devices 110. The compiler 106 can include an optimizer 114 (or "middle end"), that can generate fingerprints of an intermediate representation (IR) of the source code 104, and perform various optimizations to reduce a size of the executable 108 generated by the compiler 106. The fingerprints can be used by a number of fingerprint consumers (e.g., copyright violation, malware/virus detection, further optimizations, to name three). As for optimization via code reduction, in a particular embodiment, the optimizer 114 (or "middle end") can assign fingerprints to different portions of code, cluster portions of code based on similarity between the fingerprints, and then reduce the code size by merging the clusters of code. Reduction in code size has the likely benefit of improving cache behavior when the compiled executable is run on the computing device hardware and improving the amount of memory called on to store the intermediate representation during compilation and the executable 108.

The compiler 106 can include a parser 111, a frontend 112, an optimizer 114 or middle end, and a backend 116. In some cases, the parser 111 can be part of the frontend 112. The parser 111 parses the source code and provides the parsed source code to the frontend 112 (or frontend compiler), which generates an intermediate representation (IR) therefrom. The optimizer 114 can then perform one or more optimizations on the intermediate representation, for instance reducing duplicated code, and provide an optimized version of the intermediate representation to the backend 116 (or backend compiler). The backend 116 can generate the executable 108 from the intermediate representation.

The optimizer 114, or middle end, can also generate semantic fingerprints for the intermediate representation. This functionality can be carried out by a semantic fingerprinting module 120 configured to process the intermediate representation and generate semantic fingerprints quantitatively representing (or approximating) the intermediate representation. Thus, the semantic fingerprinting module 120 generates the semantic fingerprints and the intermediate representation as its outputs. The semantic fingerprints can be used by any number of semantic fingerprint consumers, such as optional fingerprint consumers 122 (e.g., code optimization modules, copyright violation identification modules, virus and malware identification modules, and others). For instance, a further optimizer can reduce a size of the intermediate representation using the semantic fingerprints to identify similarities between segments of code, cluster similar code, and then remove redundant code by merging code within each cluster. Specifics of semantic fingerprinting and merging will be described later in this disclosure.

Optionally, the optimizer 114 can include a canonicalization or simplification module 118 that processes the intermediate representation before the semantic fingerprinting module 120 does. The canonicalization or simplification module 118 can run a variety of optimizations that canonicalize or simplify the intermediate representation, thereby improving the effectiveness of the semantic fingerprinting module 120. For instance, the canonicalization or simplification module 118 can reduce semantically-irrelevant variations in the intermediate representation.

Optionally, the optimizer 114 can include one or more fingerprint consumers 122 that process the intermediate representation and the semantic fingerprints provided by the semantic fingerprinting module 120 (e.g., take the semantic fingerprints as an input). Examples of semantic fingerprint consumers include modules for redundancy elimination, copyright enforcement, virus and malware identification, and context-sensitive optimization. The optional fingerprint consumers 122 can process the intermediate representation and pass it to the backend 116 (the backend 116 can also be considered a fingerprint consumer). In some cases, the intermediate representation provided by the optional fingerprint consumers 122 is more efficiently handled by the backend 116 and/or takes up fewer memory resources than the intermediate representation that enters the optimizer 114. For instance, the intermediate representation received by the backend 116 may have fewer lines of code than the intermediate representation provided by the frontend 112.

The semantic fingerprint is preferably platform-independent, and is therefore computed after initial source code 104 parsing by the parser 111, while still in the static single assignment (SSA) form, and before the executable 108 is generated, which is platform specific. In one embodiment, the internal representation can be for LLVM, an extensible, modular, open-source compiler infrastructure providing a range of frontends, such as CLANG for C/C++, and backends for a multitude of hardware architectures.

The source code 104, the compiler 106, and the executable 108 can all reside in one or more memories of the developer machine 102. However, one skilled in the art will appreciate that there are other modes of operation for the compiler 106, and other memories in which one or more of these components can reside. For instance, the frontend 112 and its conversion of source code 104 to the intermediate representation can occur on the developer machine 102 or a separate computer system. The backend 116 processes the intermediate representation and generates the executable 108, and this can be performed on the developer machine 102 or on a separate computer system. In another instance, the source code 104 could reside on a first computer system and the frontend 112 could reside on a second computer system. The frontend 112 could read the source code 104 from the first computer system, generate the intermediate representation, and store the intermediate representation on a third computer system. The compiler 106 could be executed on a fourth computer system, which can read the intermediate representation from the third computer system, and can generate the executable 108 therefrom. The executable could be written to a fifth computer system. This simple example shows that the preferred embodiments expressly extend to any suitable configuration and number of computer systems to accomplish the frontend and backend compiling. The "system" and "apparatus" described herein and in the claims expressly extends to a multiple computer configuration, such as described by the example above.

As one of ordinary skill in the art will appreciate, the compiler 106 may be realized by executable code in connection with hardware that may be implemented as a part of devices such as netbooks, smartphones, tablets, and other types of developer devices. The compiler 106 is here shown as operating on a developer machine 102. However, those of skill in the art will recognize that the compiler 106 can operate on any computing device having structure enabling compiling of source code. The source code 104 can be application code. The executable 108 can be a user application that can be executed on the one or more user devices 110, and may be any of a variety of application types including entertainment apps (e.g., games) and productivity apps (e.g., business-related apps), to name just two non-limiting examples.

Returning to FIG. 1 the following are examples of platform-independent transformations that may be embodied by the optional canonicalization or simplification module 118: passes that canonicalize the intermediate representation; any passes that parse, organize and separate metadata; any general control flow graph layout passes; and presenting the intermediate representation in SSA form. Canonicalization or simplification can include evaluating expressions in the intermediate representation with known inputs and replacing expressions in the intermediate representation with the values resulting from evaluating the expressions.

Figure 2:
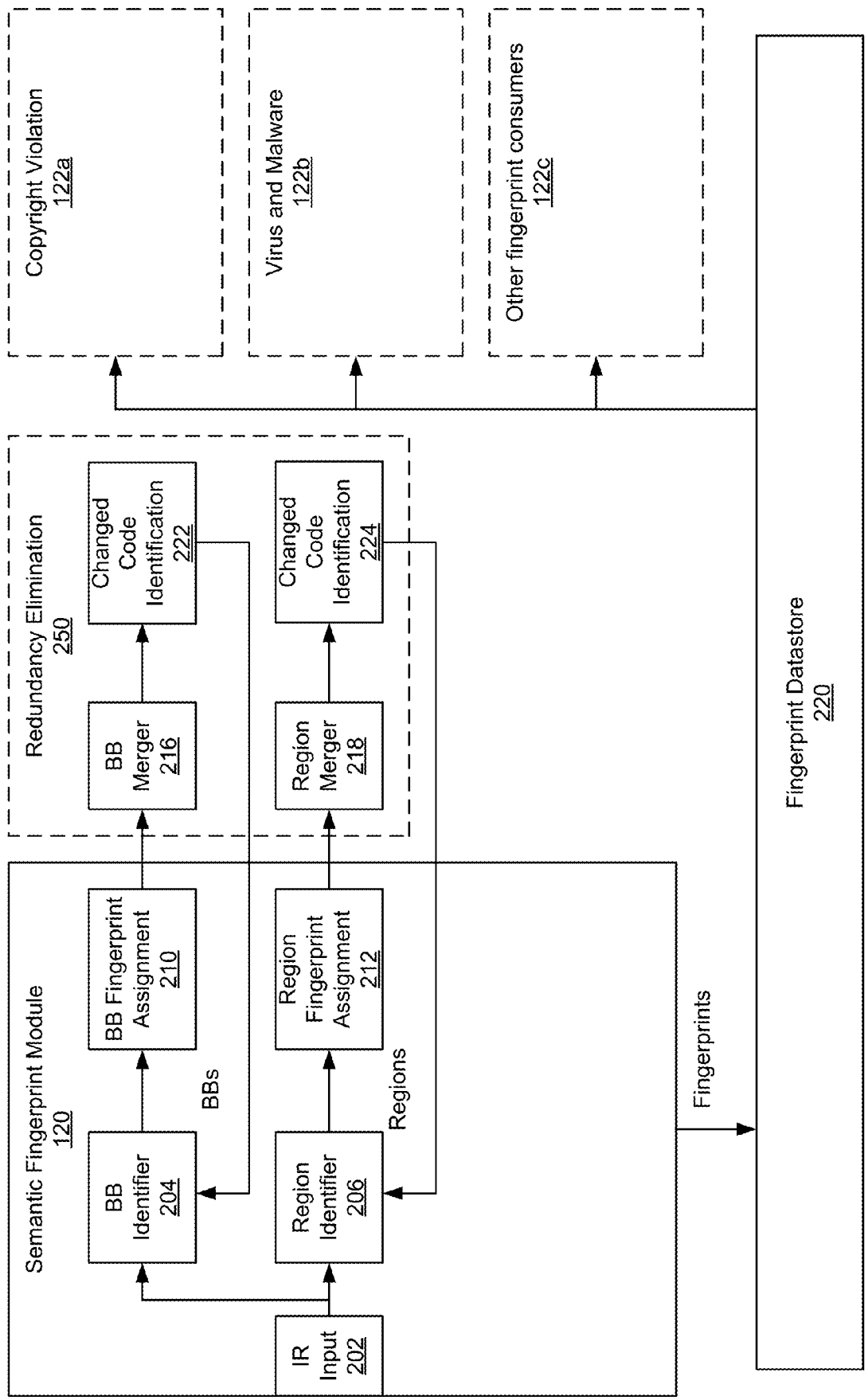
FIG. 2 illustrates one embodiment of details of the semantic fingerprinting module of FIG. 1, along with a handful of exemplary semantic fingerprint consumers.

FIG. 2 illustrates one embodiment of details of the semantic fingerprinting module 120 of FIG. 1, along with a handful of exemplary semantic fingerprint consumers. The semantic fingerprinting module 120 can include an intermediate representation input 202 configured to receive the intermediate representation from the frontend 112 (see FIG. 1). In some embodiments, optimized versions of the intermediate representation can be generated by the optional canonicalization or simplification module 118 (see FIG. 1) and provided to the intermediate representation input 202. The intermediate representation can then be broken down into basic blocks by a basic block identifier 204, where the basic block identifier 204 may separate distinct instructions from each other. In parallel or at a later point, the intermediate representation can also be broken down into regions by a region identifier 206, where the regions comprise basic blocks connected by control flow. Given the identification of the basic blocks and regions from the intermediate representation, a basic block fingerprint assignment module 210 can assign a fingerprint to the basic blocks. The fingerprint can be a numerical representation of the instructions in the basic block (a more detailed look at the fingerprinting process will be seen later). The fingerprint can be stored in a fingerprint datastore 121 that can be a part of the memory of the developer machine 102.

Given the regions identified by the region identifier 206, a region fingerprint assignment module 212 can assign a region fingerprint to each region. This can occur in parallel to or after assignment of fingerprints to the basic blocks. The region fingerprints can be stored in the fingerprint datastore 121 along with the fingerprints for the basic blocks.

Optionally, various semantic fingerprint consumers can then access the fingerprints from the fingerprint datastore 121. Such fingerprint consumers can include, but are not limited to, a copyright violation module 122*a* and a virus and malware identification module 122*b*, to name just two.

Another optional fingerprint consumer is an optional redundancy elimination module 250 that can access the fingerprints for the basic blocks and the regions and cluster basic blocks based on the similarity between fingerprints. Basic blocks within each cluster can then be merged. Thus, the redundancy elimination module 250 is configured to reduce a size of the intermediate representation through the elimination, or at least reduction in size, or redundant code. The number of clusters and the similarity of basic blocks within each cluster can be user selected via selection of a similarity criterion, such as a distance between fingerprints (e.g., subtracting a first fingerprint from a second fingerprint). In this instance, a larger value for the distance corresponds to more aggressive merging, since more basic blocks will be included in each cluster, while a smaller value corresponds to more conservative merging, since fewer basic blocks will be included in each cluster. In other words, a larger value causes a greater number of basic blocks, and less similar basic blocks, to be merged, while a smaller value causes a smaller number of basic blocks, and more similar basic blocks, to be merged. In another embodiment, the fingerprints can be vectors and the similarity criterion can be a distance between vectors, such as a Euclidean distance.

Given these clusters, a basic block merger module 216 can merge basic blocks within each cluster. The same can be performed for regions via a region merger module 218. Once merger of basic blocks is completed, a changed code identification module 222 can identify basic blocks that have changed as a result of the merging. The changed code identification module 222 can then cause the changed basic blocks to be again broken down and identified by the basic block identifier 204. New fingerprints can be re-assigned to the changed basic blocks (the original fingerprints can be replaced with newly-assigned fingerprints) and merger can again be carried out given the re-assigned fingerprints. This, iterative assignment of fingerprints and merging of the corresponding basic blocks, can repeat for a set number of loops or until no further merging is possible.

Given the re-assigned fingerprints for the unchanged and changed basic blocks, region fingerprints can be accumulated based on the fingerprints of basic blocks within each region. Region merger can then be carried out via region merger module 218, and a changed code identification module 224 can identify regions that were changed by the merging. Iterative identification of basic blocks and regions, region fingerprint re-assignment, and further merging can then follow, and this loop can continue for a fixed number of loops or until no further region mergers are possible. It should be noted that once merger of a region has occurred, changes to basic blocks are likely, and thus the iterative assignment of fingerprints to basic blocks and merging of basic blocks can be carried out after each instance of region merging, but before a next re-assignment of region fingerprints. This iterative process can be more clearly seen in FIG. 6. It should be appreciated that region merger can take place before basic block merger in an alternative embodiment.

Once merging of regions is complete, the resulting fingerprints for the basic blocks and the resulting region fingerprints can be stored in the fingerprint datastore 220, and provided to further semantic fingerprint consumers (although fingerprints can be stored in real-time in the fingerprint datastore 220, not just after competition of region merging). For instance, the redundancy elimination module 250 can reduce a size of the intermediate representation via merger of redundant and similar portions of code, and can then provide the resulting fingerprints to the optional copyright violation module 122*a* or optional virus and malware module 122*b* as well as provide the optimized intermediate representation to the backend 116.

It should be noted that the use of fingerprints and clustering based on these fingerprints means that basic blocks that have different numbers of instructions and different control flow can be compared (and by implication the same advantage is true for comparison of regions). This also means that basic blocks and regions having different numbers of instructions and different control flow can be merged.

In the art, comparison between portions of code as well as merger of portions of code was only possible when the portions had the same number of instructions and the same control flow. This distinction enables the presently-disclosed systems and methods the ability to compare and merge a greater variety of portions of code than is possible in the art, and as a result enables greater code reduction and better cache usage.

Figure 3:
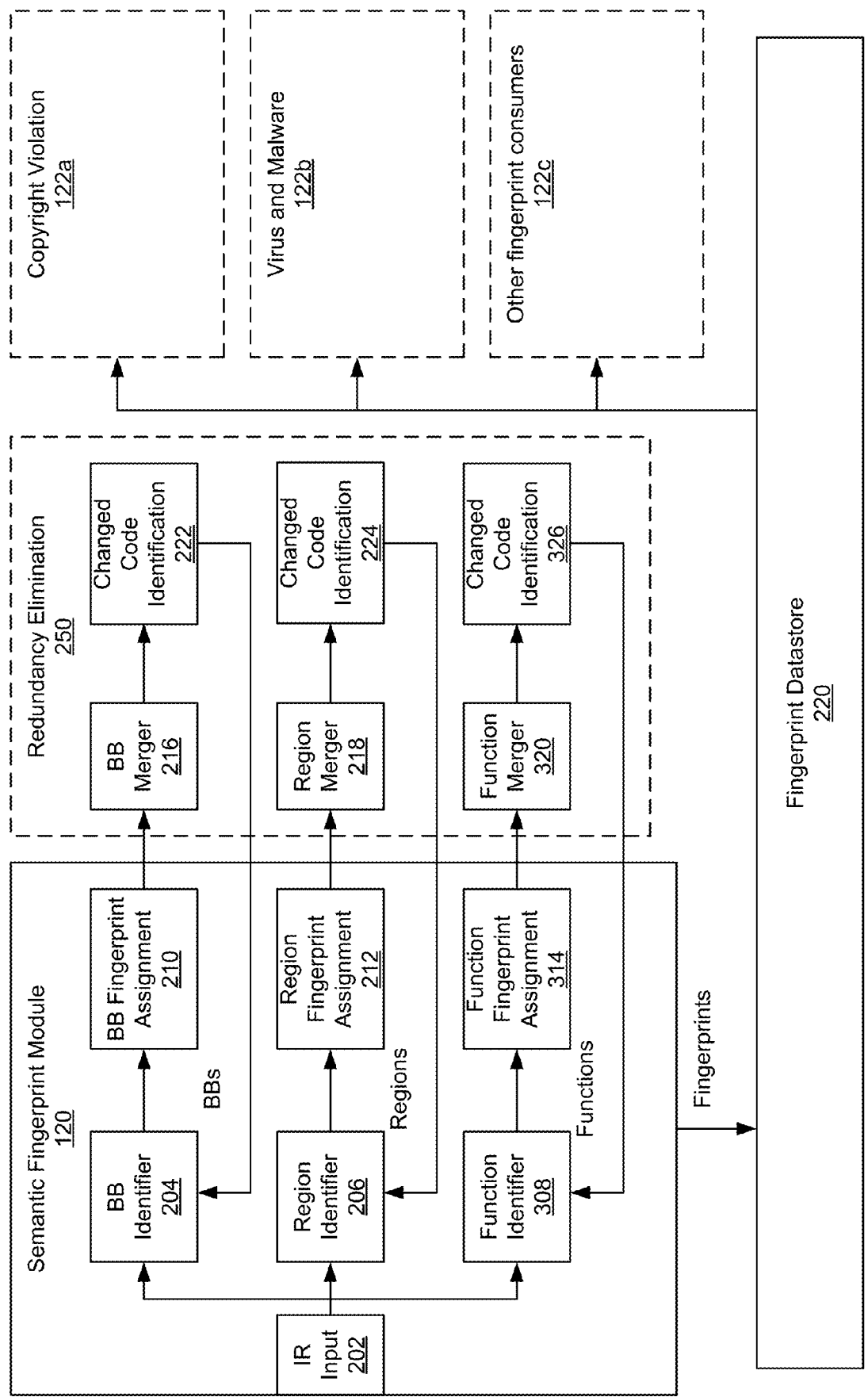
FIG. 3 illustrates a block diagram of details of the semantic fingerprinting module 120 where merger of functions is part of an optional redundancy elimination module.

In some embodiments, merger of functions is also desired. FIG. 3 illustrates a block diagram of details of the semantic fingerprinting module 120 where merger of functions is part of an optional redundancy elimination module 250. In this embodiment, the semantic fingerprinting module 120 includes a function identifier 308 and a function fingerprint assignment module 314. The function identifier 308 can break up the intermediate representation into functions, where the functions are made up of regions coupled via control flow. The function fingerprint assignment module 314 can then assign a function fingerprint to each function by accumulating the region fingerprints and values for the control flow between the regions of a given function. The function fingerprints can be stored in the fingerprint datastore 220 and accessed by consumers of semantic fingerprints. Generation of fingerprints for basic blocks and regions is carried out as described relative to FIG. 2. In an alternative embodiment, the order of merging can be reversed such that functions, then regions, then basic blocks are merged.

In an embodiment, an optional redundancy elimination module 250 can be the consumer and can include a function merger module 320 and a changed code identification module 326. The function merger module 320 can operate once the region merger module 218 has completed merging of regions or iterative merging of regions. As an input, the function merger module 320 accesses function fingerprints from the fingerprint datastore 220 that have been generated by accumulating region fingerprints, or by accumulating all fingerprints for basic blocks within a given function. Then the function merger module 320 can cluster functions based on the similarity between function fingerprints, and merge functions within each cluster. The number of clusters and the similarity of functions within each cluster can be user selected via selection of a similarity criterion, such as a distance between fingerprints. In this instance, a larger value for the distance corresponds to more aggressive merging, since more functions will be included in each cluster, while a smaller value corresponds to more conservative merging, since fewer functions will be included in each cluster. In other words, a larger value causes a greater number of functions, and less similar functions, to be merged, while a smaller value causes a smaller number of functions, and more similar functions, to be merged.

Given these clusters, the function merger module 320 can merge functions within each cluster. Once merger of functions is completed, a changed code identification module 326 can identify functions that have changed as a result of the merging and causes re-identification of these changed functions via the function identifier 308. New function fingerprints can then be re-assigned to the changed functions and merger can again be carried out. This, iterative assignment of function fingerprints, and subsequent merging, can repeat for a set number of loops or until no further merging of functions is possible.

In some cases, function fingerprints may be assigned before region merging takes place. In this case, re-assigning of function fingerprints may occur before function merger.

Part of re-assigning function fingerprints may involve iterative re-assignment of region fingerprints and fingerprints to basic blocks. For instance, where two functions are merged, the original two functions will be replaced with wrappers calling to the merged function, and these wrappers will comprise less code than the original functions. This means that the fingerprints for the original functions are no longer valid, and needs to be re-assigned to these wrappers. (e.g., see original functions in FIG. 19 and merged function along with wrappers that replace the original functions in FIG. 22). Thus, as part of re-assigning a fingerprint to a changed function, the semantic fingerprinting module 120 and the optional redundancy elimination module 250 may iteratively re-assign fingerprints to portions of code that make up the changed function (e.g., basic blocks and regions). As before, the iterative process of assigning fingerprints and merging basic blocks and regions may be carried out for a fixed number of loops or until no further merging is possible. Once re-assignments of fingerprints to basic blocks and regions is complete, the region fingerprints for a given function can be re-accumulated along with values for the control flow therebetween to give the new function fingerprint. In this fashion, function fingerprints can be re-assigned after each function merger. This iterative process can be more clearly seen in FIG. 7.

While FIGS. 2 and 3 have discussed merger of basic blocks, then regions, and optionally then functions, such an order can be altered. In alternative embodiments, functions, then regions, then basic blocks can be merged, with re-assignment of fingerprints occurring anytime that portions of code are changed by merging. In other embodiments, regions, then functions, then basic blocks can be merged, with re-assignment of fingerprints occurring along the way. Various other orders or merging and re-assigning of fingerprints can be implemented.

Figure 17:
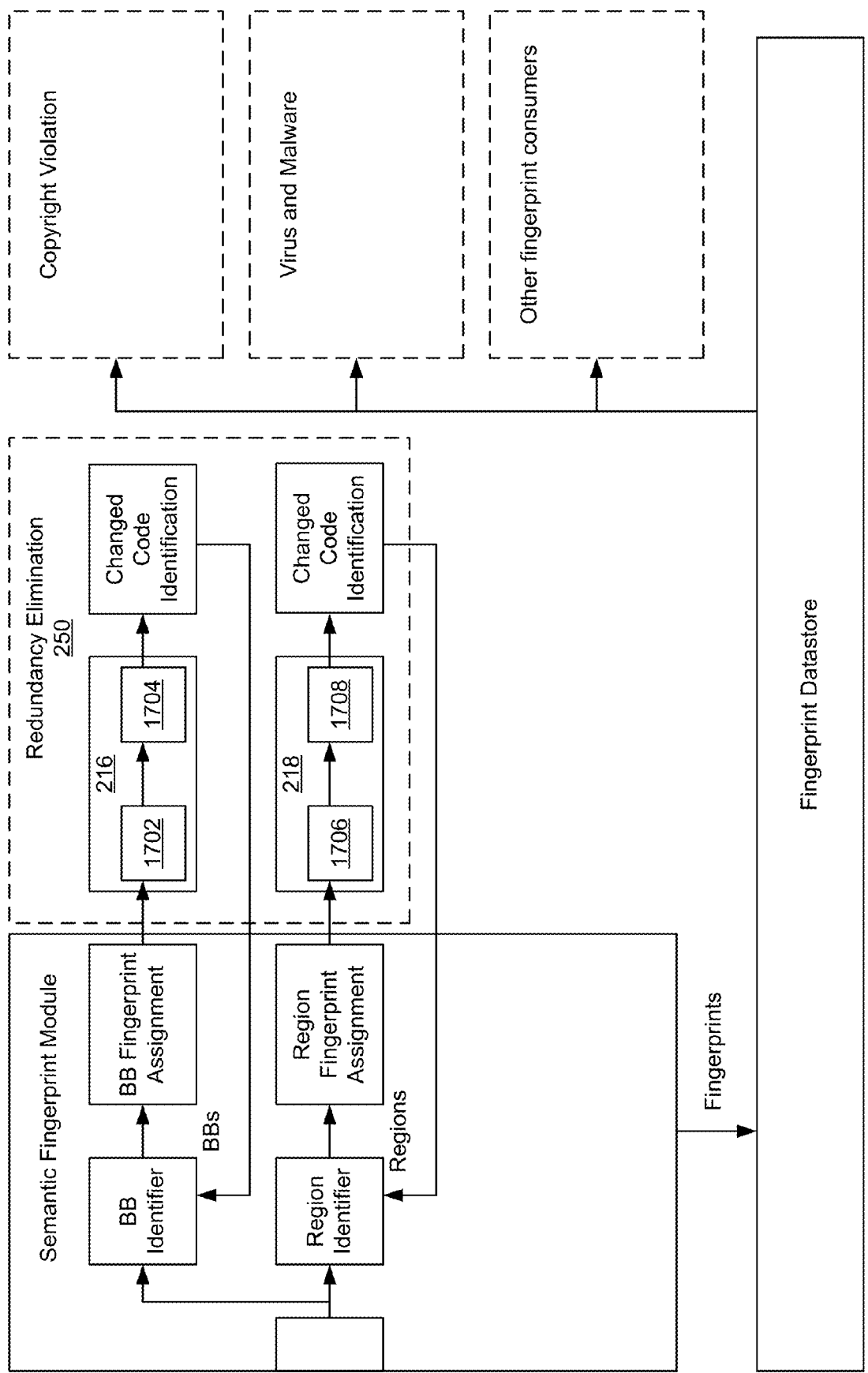
FIG. 17 illustrates one embodiment of details of a redundancy elimination module.
Figure 18:
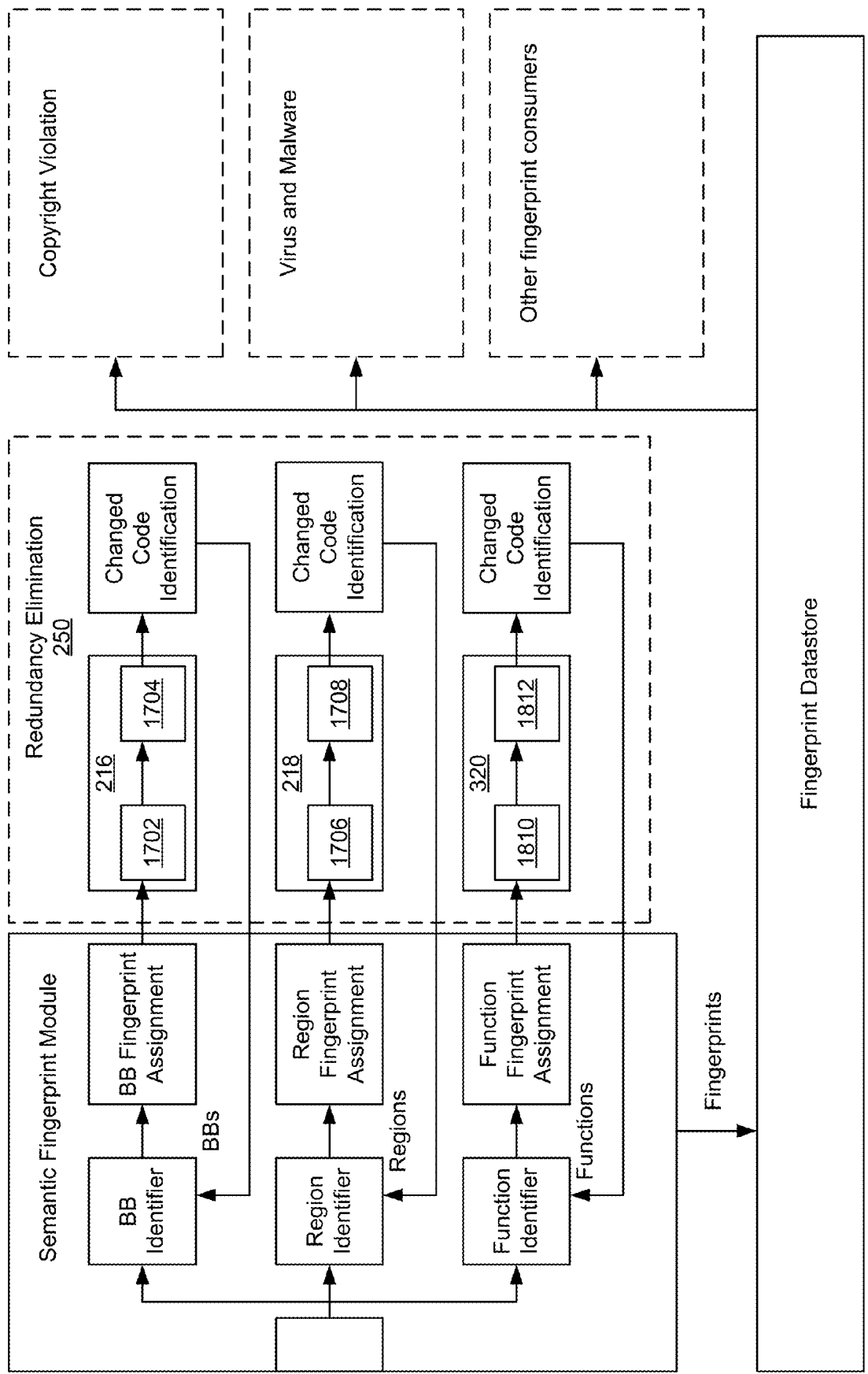
FIG. 18 illustrates another embodiment of details of a redundancy elimination module.

FIGS. 17 and 18 show more detailed alternatives to the optional redundancy elimination module 250. In particular, the merging modules 216, 218, and 320 can include sub modules configured to cluster similar portions of code and to then merge those clusters. Merging can mean that the original portions of code in each cluster are replaced with a single merged portion of code using new control flow and arguments to address local differences between the original portions of code. At the same time, the original portions of code can be replace with wrappers calling the single portion of code using the new arguments. An example of clustering and merging of two similar functions can be seen in FIGS. 19-22.

In FIG. 17, the basic block merger module 216 can include a basic block clustering module 1702 and a basic block cluster merging module 1704. The basic block clustering module 1702 can compare fingerprints of basic blocks and based on a similarity criterion (e.g., a threshold difference between fingerprints for basic blocks), the basic block clustering module 1702 can group the basic blocks into clusters, where all basic blocks within a cluster have fingerprints that meet the similarity criterion relative to all other basic blocks in the cluster. The use of semantic fingerprints to perform this clustering means that basic blocks can be clustered even where the number of instructions differs between them.

The basic block cluster merging module 1704, for each cluster, can then merge all basic blocks in each cluster. In some cases, clusters may have multiple basic blocks and thus numerous basic blocks can be reduced to a single basic block. Other clusters may only contain a single basic block (where certain basic blocks are sufficiently different from all other basic blocks that no merger with any other basic block is possible or desired). Thus, clustering and merging is unlikely to affect all basic blocks, although such a possibility is not ruled out.

The region merger module 218 can include a region clustering module 1706 and a region cluster merging module 1708. The region clustering module 1706 can compare fingerprints of regions and based on a similarity criterion (e.g., a threshold difference between region fingerprints), the region clustering module 1706 can group the regions into clusters, where all regions within a cluster have fingerprints that meet the similarity criterion relative to all other regions in the cluster. The use of semantic fingerprints to perform this clustering means that regions can be clustered even where the number of instructions in the basic blocks of the regions differs and even where the control flow between basic blocks differs.

The region cluster merging module 1708 can then merge all regions in a given cluster. In some cases clusters may have multiple regions and thus numerous regions can be merged to a single merged region and the original regions can be replaced with wrappers calling to the new merged region. Other clusters may only contain a single region (where certain regions are sufficiently different from all other regions that no merger with any other region is possible or desired). Thus, clustering and merging is unlikely to affect all regions, although such a possibility is not ruled out.

FIG. 18 illustrates an embodiment were functions are also merged. Here, the function merger module 320 includes a function clustering module 1810 and a function cluster merging module 1812. The function clustering module 1810 can compare fingerprints of functions and based on a similarity criterion (e.g., a threshold difference between function fingerprints), the function clustering module 1810 can group the functions into clusters, where all functions within a cluster have fingerprints that meet the similarity criterion relative to all other functions in the cluster. The use of semantic fingerprints to perform this clustering means that functions can be clustered even where the number of instructions in the basic blocks of the functions differs and even where the control flow between regions of the function differs.

The function cluster merging module 1812 can then merge all functions in a given cluster. In some cases clusters may have multiple functions and thus numerous functions can be replaced by a single merged function and small wrappers replacing each original function, where the wrappers call the merged function using new arguments that are included in the single merged function. When the wrappers call the merged function, they provide one or more arguments unique to the original function, and this causes the merged function to follow control flow producing an output equivalent to what the original function would have produced had it not been merged. Other clusters may only contain a single function (where certain functions are sufficiently different from all other functions that no merger with any other function is possible or desired). Thus, clustering and merging is unlikely to affect all functions, although such a possibility is not ruled out.

Figure 4:
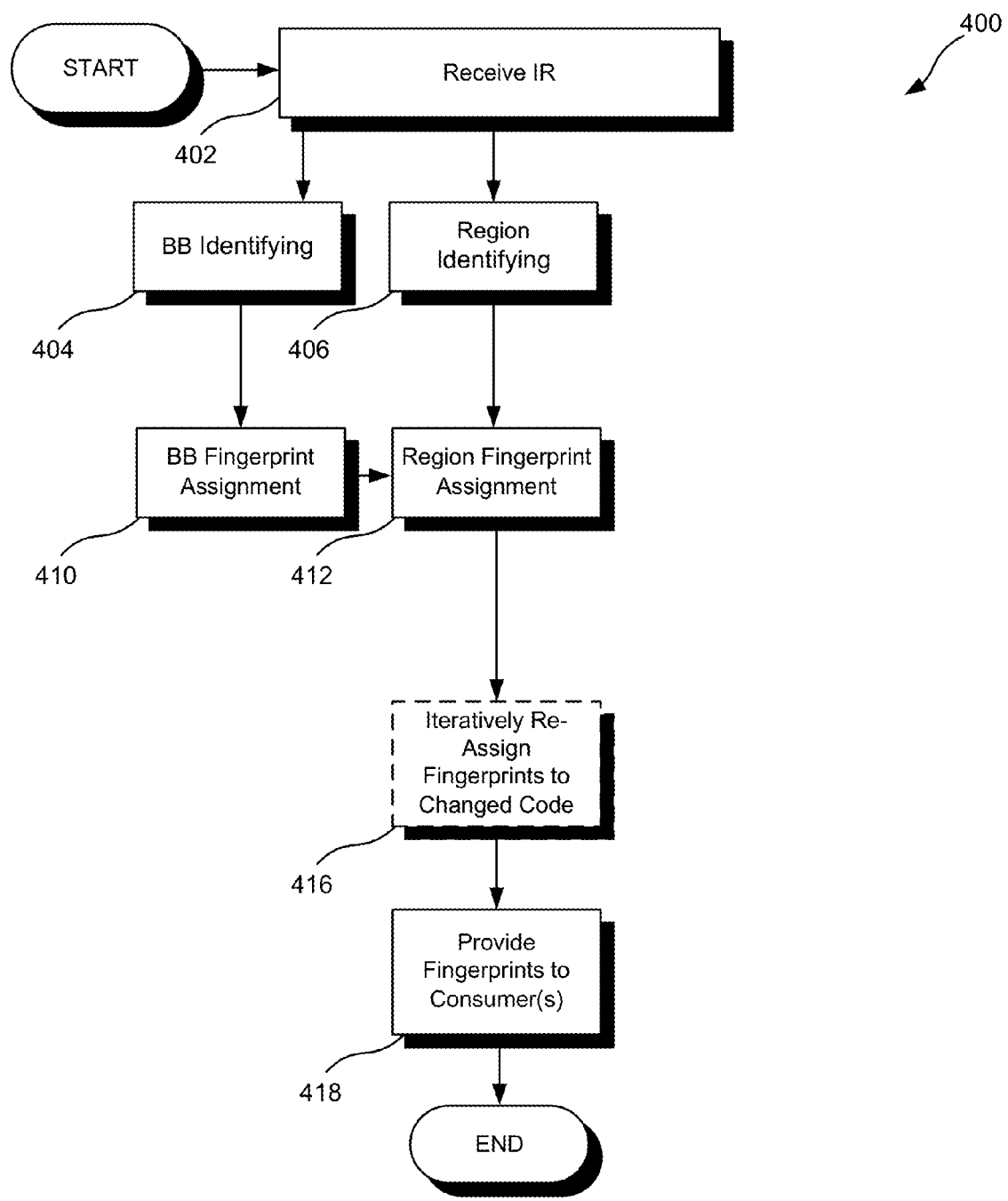
FIG. 4 illustrates a method for generating fingerprints for basic blocks and regions.

FIG. 4 illustrates a method for generating fingerprints for basic blocks and regions. The method 400 can begin with receipt of an intermediate representation (Block 402), for instance at an optimizer or middle end such as optimizer 114 (see FIG. 1). The intermediate representation can be broken down and basic blocks can be identified (Block 404) and regions can be identified (Block 406), where identification of basic blocks and regions can occur in parallel or at separate times. In some instances, canonicalization or simplification of the intermediate representation can occur before the identifying (Blocks 404, 406) (e.g., via the canonicalization or simplification module 118 of FIG. 1). Fingerprints can then be assigned to the basic blocks (Block 410) and to the regions (Block 412). To reduce the overhead of assigning region fingerprints, the region fingerprints can be assigned by accumulating the fingerprints for basic blocks within each region along with values for control flow between the basic blocks of the region being fingerprinted (Block 412). This greatly reduces the burden region fingerprinting. The method 400 may then provide the fingerprints for the basic blocks and the region fingerprints to consumers of semantic fingerprints (Block 418), such as optional fingerprint consumers 122 in FIG. 1.

Figure 5:
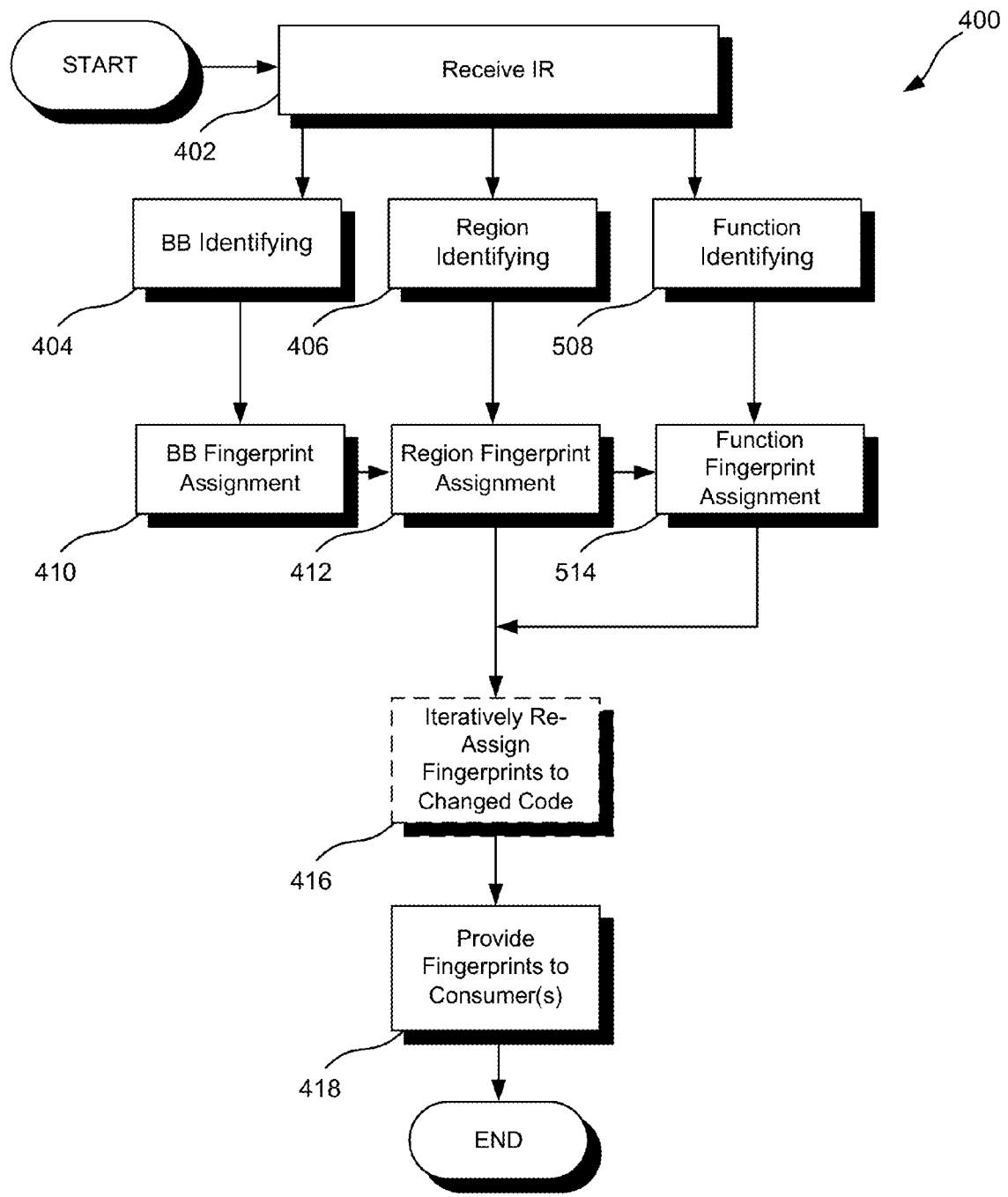
FIG. 5 illustrates a method for generating fingerprints for basic blocks, regions, and functions.

In another embodiment, a consumer may change the regions and basic blocks (e.g., a consumer that merges similar or identical portions of code), which may thereby make it beneficial to re-assign fingerprints. In this case, fingerprints can be iteratively re-assigned to any changed portions of the code (optional Block 416). Iterative re-assignment of fingerprints may involve merger of basic blocks or regions followed by assignment of fingerprints to changed basic blocks and regions, followed by further merger and assignment of new fingerprints. This iterative process may continue for a fixed number of loops or until merger of basic blocks and regions is no longer possible.

Where merger of functions is also desired, FIG. 5 illustrates a method for generating fingerprints for basic blocks, regions, and functions. The method 500 operates like the method 400, but with added steps to account for functions. In particular, function identification (Block 508) can occur in parallel or at another time from the identification of basic blocks and regions (Blocks 404, 406). Once region fingerprints have been assigned (Block 412), function fingerprint assignment (Block 514) can accumulate the region fingerprints for each function along with values for control flow between regions of a given function to provide a function fingerprint for each function (Block 514). To reduce the overhead of fingerprint assignment, function fingerprints can be assigned by accumulating the fingerprints for regions within each function along with values for control flow between those regions (Block 514). This accumulation avoids the need to calculate the function fingerprint by accumulating every basic block in the function. The method 500 may then provide the fingerprints for the basic blocks, regions, and functions to consumers of semantic fingerprints (Block 418), such as optional fingerprint consumers 122 in FIG. 1 (e.g., code optimization module(s)).

However, in another embodiment, a consumer may change the functions, regions, and basic blocks (e.g., a consumer that merges similar or identical portions of code), which may thereby make it beneficial to re-assign fingerprints. In this case, fingerprints can be iteratively re-assigned to any changed portions of the code (optional Block 416). Iterative re-assignment of fingerprints may involve merger of basic blocks, regions, and functions along with re-assignment of fingerprints to changed basic blocks, regions, and functions followed by further merger and assignment of new fingerprints. This iterative process may continue for a fixed number of loops or until merger of basic blocks, regions, and functions is no longer possible.

Figure 6:
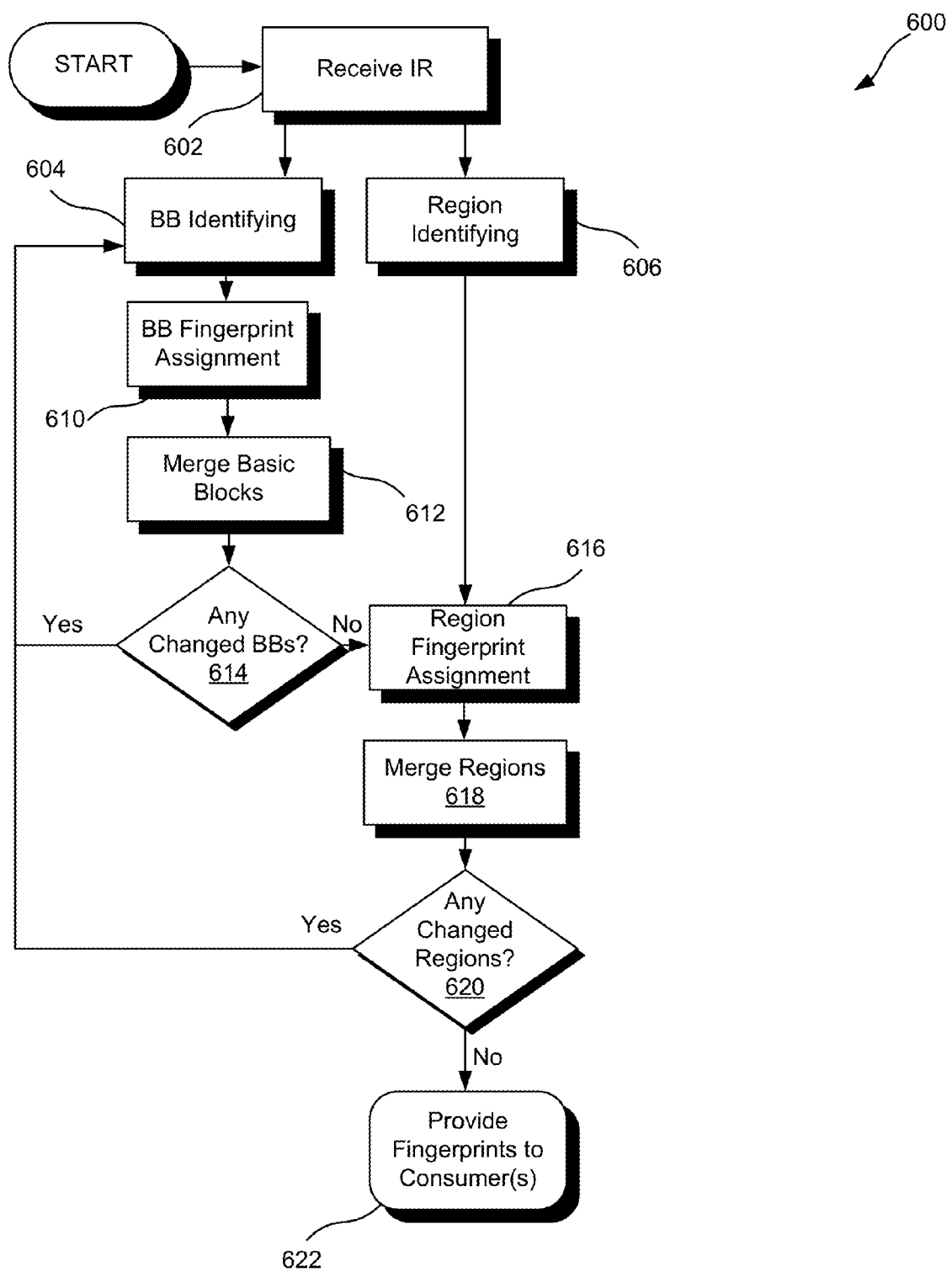
FIG. 6 illustrates another method for generating fingerprints for basic blocks and regions, but where the consumer is assumed to cause merger of regions.

FIG. 6 illustrates another method for generating fingerprints for basic blocks and regions, but where the consumer is assumed to cause merger of regions. The method 600 can begin with receipt of an intermediate representation (Block 602), for instance at an optimizer or middle end such as optimizer 114 (see FIG. 1). The intermediate representation can be broken down and basic blocks can be identified (Block 604) and regions can be identified (Block 606), where region identification (Block 606) can occur in parallel or at a different time to identification of basic blocks (Block 604) (e.g., after merger of basic blocks). Once basic blocks are identified, fingerprints can be assigned to the basic blocks (Block 610). The method 600 then merges basic blocks (Block 612), if any can be merged, and determines if the merging has changed any basic blocks (Decision 614). Merging often involves eliminating basic blocks and making changes to the instructions of basic blocks that remain. For instance, the assignment of fingerprints to basic blocks (Block 610) may not account for every detailed difference between basic blocks, and upon merger, the resulting wrapper and calls to the wrapper can include code that accounts for the differences not captured by the fingerprints. Merging can include clustering similar and identical basic blocks and then merging the original basic blocks within each cluster into a new merged basic block. Wrappers, that include far less code than the original basic blocks, can replace the original basic blocks. Where no basic blocks were merged, there should be no changes to the basic blocks. If a change has occurred due to merger, then the method 600 returns to identification of basic blocks (Block 604), which may be performed for all basic blocks or only those that have changed as a result of merger. Fingerprints are then re-assigned to the basic blocks (Block 610), so that the new fingerprints represent the basic blocks after merger. This looping continues until no further basic blocks can be merged, or until a fixed number of loops has been reached. If the decision 614 at any time determines that no changes to the basic blocks has occurred, then the method 600 proceeds to region fingerprint and merger.

To reduce the overhead of fingerprint assignment, region fingerprints can be assigned by accumulating the fingerprints for the basic blocks within each region along with values for control flow between those basic blocks (Block 616). The method 600 can then merge regions (Block 618), if any can be merged, which often involves eliminating regions and making changes to the basic blocks of remaining regions. For instance, the assignment of fingerprints to regions (Block 616) may not account for every detailed difference between regions, and upon merger, the resulting wrapper and calls to the wrapper can include code that accounts for the differences not captured by the fingerprints. Merging can include clustering similar and identical regions and then merging the original regions within each cluster into a new merged region. Wrappers, that include far less code than the original regions, can replace the original regions and these wrappers. Control flow (e.g., "select" and "if" constructs, to name two) may be inserted into the new merged region to account for differences between the original regions. Additional arguments can be added to the new merged region to select proper control flow through the merged region to account for the different outcomes of the original regions (i.e., so that the merged region mimics the functionality of the original regions). The wrappers can provide one or more arguments to the merged region such that the merged region follows a control flow producing an output that the corresponding original function would have produced prior to merger. Clusters naturally represent sets of highly similar regions that are candidates for merging.

Since merger causes changes to basic blocks (i.e., the original basic blocks that are being merged are replaced with wrappers that call the new merged basic block), the fingerprints for merged basic blocks may no longer be accurate, meaning that the region fingerprints may no longer be accurate. To remedy this situation, the method 600 can first check to see if any regions have changed (Decision 620) (e.g., have any regions been replaced by a wrapper calling a merged region), and if so, the method 600 can return to identification of basis blocks (Block 604), since region changes imply that basic blocks making up the changed regions have changed. Fingerprints can be re-assigned to the basic blocks (Block 610) and basic blocks can be merged (Block 612). Basic block merger and re-assignment of fingerprints can continue until no more merger is possible or until a fixed number of loops has been met. Once this occurs, region fingerprints can be re-assigned to the now modified regions (Block 616), by accumulating the fingerprints for the basic blocks, and regions can again be merged (Block 618). This looping continues until no further basic blocks can be merged, or until a fixed number of loops has been reached. During this looping, if the Decision 620 determines that no changes to the regions has occurred, then the method 600 provides the resulting fingerprints for the basic blocks and region fingerprints to one or more consumers of semantic fingerprints (Block 622), such as optional fingerprint consumers 122 in FIG. 1.

Figure 7:
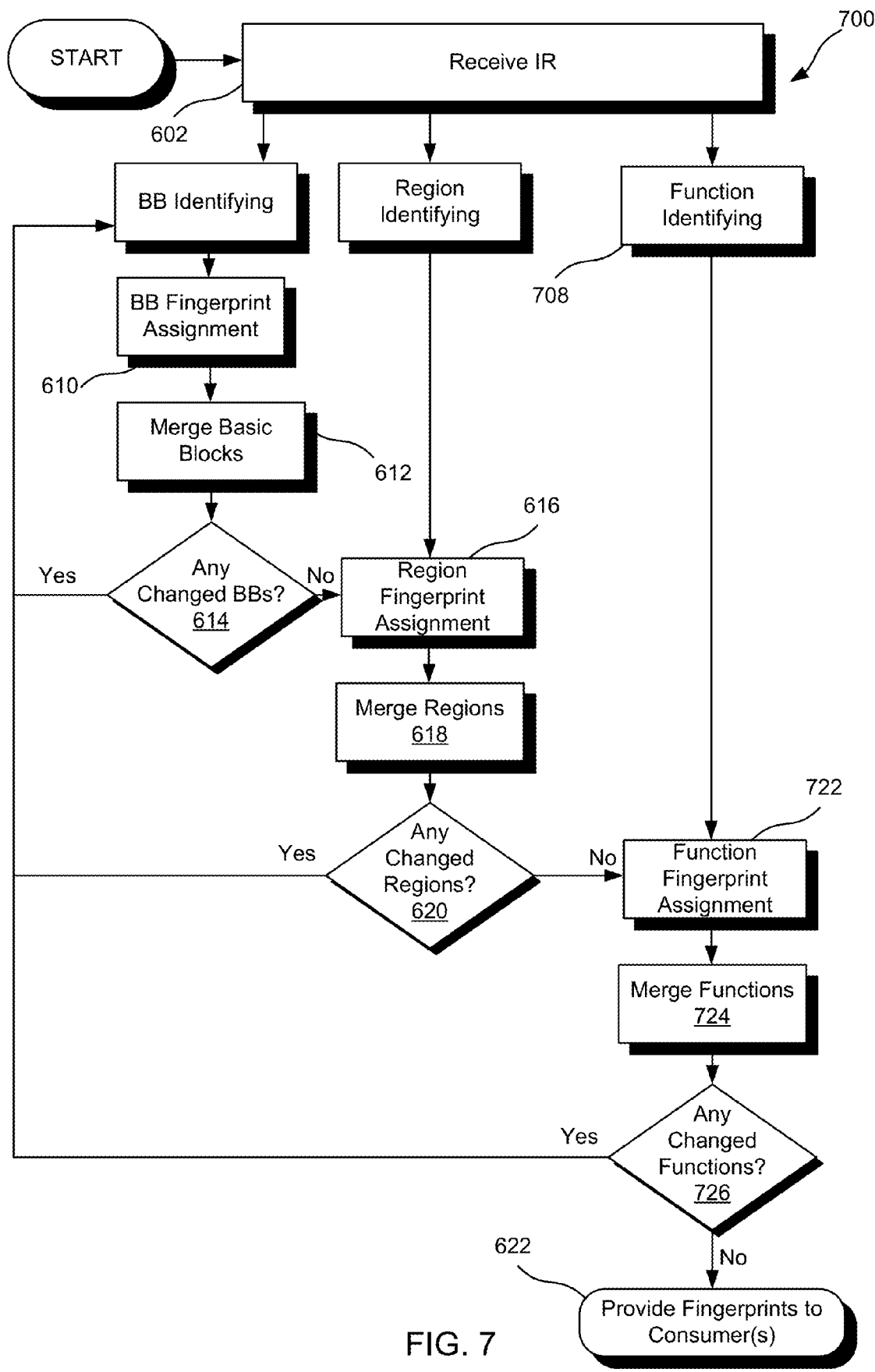
FIG. 7 illustrates a method for generating fingerprints for basic blocks, regions, and functions, and where the consumer is assumed to cause merger of functions.

Returning to the merge basic blocks (Block 612) and merge regions (Block 616), in an embodiment, the similarity between basic blocks and between regions required for merger can be user selected (e.g., selected by a developer or user of the developer machine 102). For instance, a user-defined similarity criterion of minimum similarity may determine a number of clusters and may control a time spent clustering basic blocks and regions. Selecting an optimum similarity criterion may decrease the amount of time spent clustering and merging basic blocks and regions. Merging eliminates duplicate code, while preserving local differences in the original basic blocks and regions, thereby achieving a better cache behavior (e.g., fewer lines of the intermediate representation and thus the executable 108 takes up less cache memory when executed on user devices 110).

Where merger of functions is also desired, FIG. 7 illustrates a method for generating fingerprints for basic blocks, regions, and functions, and where the fingerprint consumer is assumed to cause merger of functions. The method 700 operates like the method 600, but with added steps to account for functions. In particular, function identification (Block 708) can occur in parallel to or after region identification (Block 606) and basic block identification (Block 604). An iterative process of merging basic blocks and regions, and re-assigning fingerprints to regions and basic blocks can then proceed for a fixed number of loops or until no further region merger is possible (Blocks 604, 610, 612, 616, 618, and Decisions 614 and 620). Once this iterative process is complete, the region fingerprints and values for control flow between regions can be accumulated to generate function fingerprints that can be assigned to the functions (Block 722) identified in function identification (Block 708). The method 700 can then merge functions having sufficient similarity based on their function fingerprints (Block 724).

Merging can include clustering similar and identical functions and then merging the original functions by forming a single merged function and replacing the original function with a wrapper that calls the single merged function. The wrapper can provide one or more arguments when calling the merged function, such that the merged function follows control flow resulting in a same output as the original functions would have if there was no merger. The assignment of fingerprints to functions (Block 722) may not account for every detailed difference between functions, and upon merger, the resulting new merged function and wrappers that call the new merged function can include code that accounts for the differences not captured by the fingerprints.

Clustering can involve analyzing the semantic fingerprints of the functions, measuring differences between semantic fingerprints or performing some other comparison of the fingerprints, and then clustering those functions having semantic fingerprints that fall within a threshold difference of each other (or within some other criteria of similarity). Cluster merging can include identifying identical or shared code between the functions in a cluster (original functions to be merged) and forming a new merged function comprising the identical or shared code and control flow (e.g., "select" and "if" constructs, to name two) to account for differences between the original functions. Additional arguments can be added to the new merged function to select proper control flow through the new merged function to account for the different outcomes of the original functions. Clusters naturally represent sets of highly similar functions that are candidates for merging. As with basic blocks and regions, the similarity between functions required for merger can be user selected (e.g., selected by a developer or user of the developer machine 102). For instance, a user-defined criterion of minimum similarity may determine the number of clusters and may control the time spent clustering. Selecting an optimum similarity criterion may decrease the amount of time spent clustering and merging functions. Merging, eliminates duplicate code, while preserving local differences in the original functions, thereby achieving a better cache behavior (e.g., fewer lines of the intermediate representation and thus the executable 108 means less valuable cache memory is used when the executable 108 is executed on user devices 110).

The method 700 then checks to see if any functions have changed (Decision 726) as a result of the function merger, and if so, the method 700 returns to identification of changed basic blocks (Block 604) and iteratively merges and re-assigns fingerprints to the basic blocks and regions. Once all regions have again been merged to the fullest extent, or after a fixed number of loops of Blocks 604-620, function fingerprints can be re-assigned (Block 722), and further function merging can occur (Block 724) based on the re-assigned function fingerprints. This looping can continue for a fixed number of loops or until no further function merging is possible (Decision 726). The method 700 then provides the fingerprints to one or more semantic fingerprint consumers (Block 622).

As noted earlier, some examples of fingerprint consumers (e.g., optional fingerprint consumers 122 in FIG. 1) include, but are not limited to, one or more code optimization modules configured to merge redundant and similar portions of code (e.g., optional redundancy elimination module 250 in FIGS. 2 and 3), a back end configured to transform the intermediate representation to machine code or assembly code (e.g., backend 116 in FIG. 1), a copyright violation identification module that compares the region fingerprints to fingerprints of copyrighted code (e.g., optional copyright violation module 122a in FIGS. 2 and 3), and a virus and/or malware identification module that compares the region fingerprints to fingerprints of intermediate representations of known virus and/or malware code (e.g., optional virus and malware module 122b in FIGS. 2 and 3).

Referring back to the generation of the semantic fingerprints for basic blocks, regions, and functions, arithmetic operations can each be assigned a unique value such that an "add" instruction is numerically "far" from the value assigned to a "subtract" or "multiply" instruction. Yet, being far from another instruction does not mean that in combination with other instructions, the eventual fingerprint will not be close enough to enable merger of two regions or functions. Rather, this distance merely decreases the likelihood that the eventual fingerprint will be close enough to result in merger of a region or function. Whether merger occurs or not is ultimately dictated by the similarity criteria. Memory instructions may be assigned numerical values based on a data type that the memory instruction deals with. Address resolution and aliasing analysis for each memory instruction may not at first be factored into a numerical value assigned to a memory instruction. Rather, these aspects of the memory instruction may be considered primarily when actual merging occurs. In other words, fingerprints do not encode every last detail of an instruction, basic block, region, or function. However, these details are relevant, and are to be accounted for at some point, just later than at the fingerprinting stage. This disclosure accounts for those differences at the point of merger of other consumption of the fingerprint. During merger or other consumption, the differences between instructions, basic blocks, regions, or functions not captured by the fingerprints, can be identified via comparison of the merged instructions, basic blocks, regions, or functions, and the differences can be accounted for via control flow or other means. Call instructions can be assigned numerical values based on the number and types of the arguments that the called function consumes (the "signature" of the called function), and like memory instructions, exact call site parsing (comparison of the details of the function being called) may be performed at a later point, for instance, when a detailed comparison occurs. For instance, given the need to fingerprint the C function, "raise X to the power of N," it signature could be:

double pow (double base, double exponent)

Expressed in English this translates to a function that takes two arguments of the type "double" and returns a result of the type "double." In the fingerprint of this function, the disclosure would encode the above argument signature but not the fact that the called function is "pow."

Figure 8:
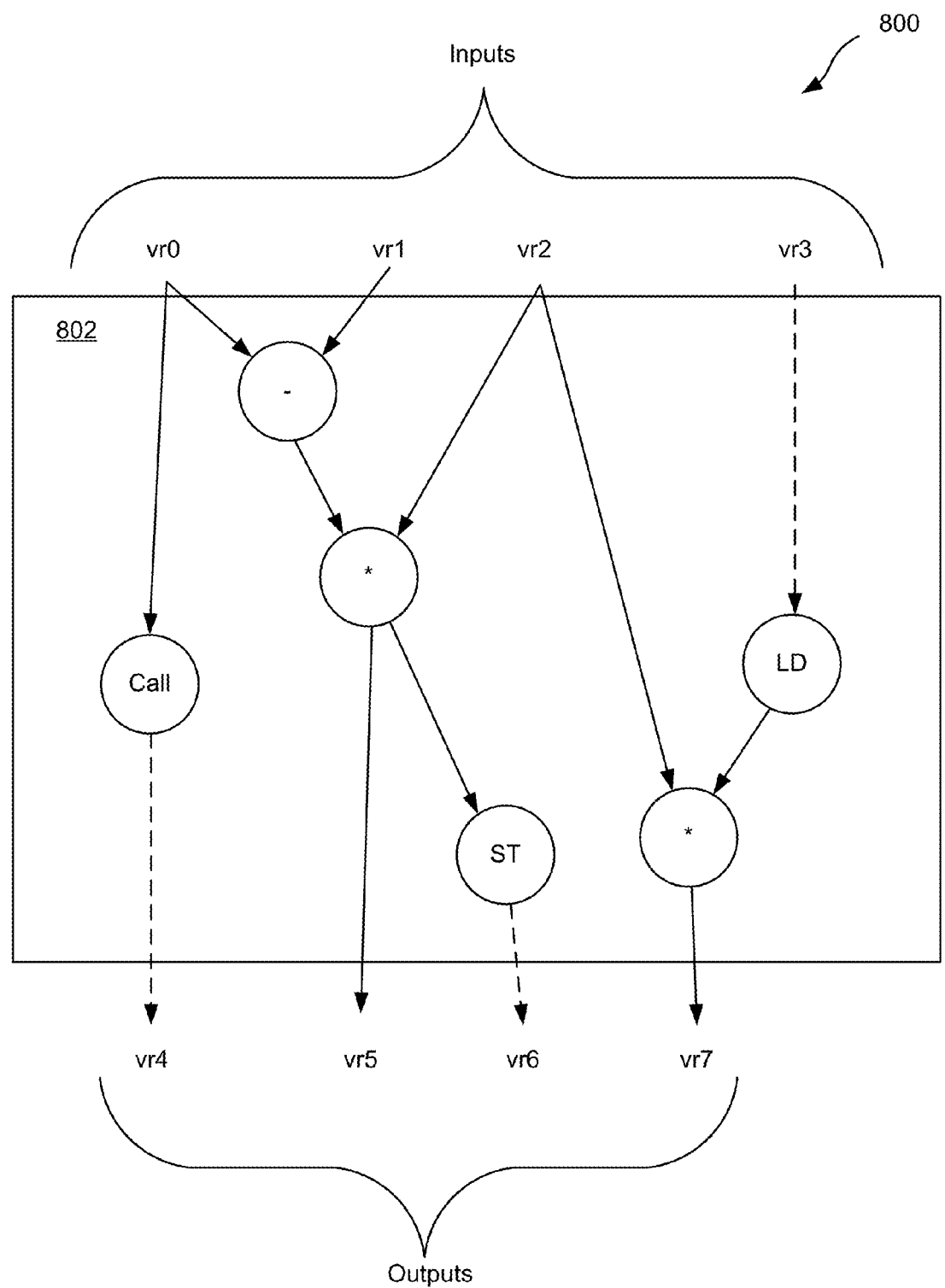
FIG. 8 illustrates a block diagram of a control flow graph 800 for a basic block 802.

FIG. 8 illustrates a block diagram of a control flow graph 800 for a basic block 802. This control flow graph 800 helps illustrate how fingerprints for basic blocks are determined (i.e., as an aggregation of all live ranges of live-out values for the basic block).

A basic block includes inputs and outputs, and instructions or operations that operate on the inputs to generate the outputs. In the illustration, the instructions or operations are represented by circles surrounding symbols, letters, and words. For instance, there are instructions for subtraction and multiplication operations in the illustrated basic block 802, among others. Arrows link inputs, instructions, and outputs, and the whole control flow graph 800 represents the way that a compiler views a basic block.

Inputs are also known as "live-in values" and outputs are also known as "live-out values." Inputs and outputs can be stored in memory, such as a physical memory or a virtual memory. Thus the four inputs and the four outputs are labeled vr0 to vr7.

Computing a semantic fingerprint for a basic block will be described using the example control flow graph 800 shown in FIG. 8 along with the method 900 for computing a semantic fingerprint for a basic block shown in FIG. 9. For each output (e.g., vr4 to vr7), the compiler can follow a flow backward through the instructions in the control flow graph 800 to corresponding inputs (e.g., vr0 to vr3) until each path from an output to all corresponding inputs has been traversed. While following each of these flows, a numerical representation of each instruction can be determined and these values can be accumulated as the compiler walks through the instructions. Accumulating can mean that each instruction is assigned a numerical value, and these values are added, concatenated, or otherwise combined. Once each path from an output to an input has been traversed and all values accumulated along those traversals, the end value can be considered a semantic fingerprint for the basic block 802.

Figure 9:
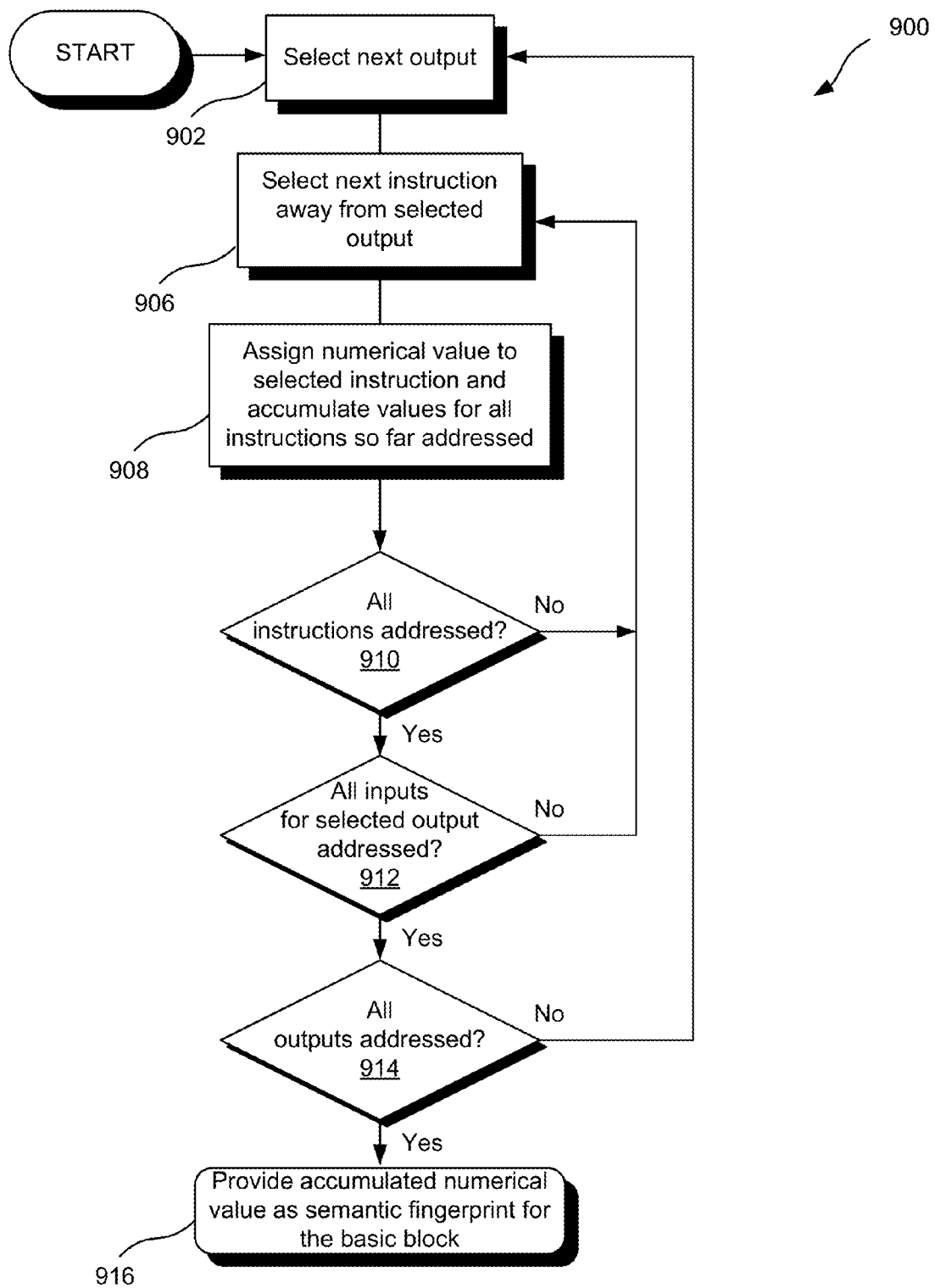
FIG. 9 illustrates a method for determining a semantic fingerprint for a basic block.

This process is described in more detail relative to FIG. 9. The method 900 begins by selecting a next output of the basic block (Block 902). For instance, in the example of FIG. 8, the method 900 could start with any of the outputs vr4-vr7. As an illustration, assume we start with vr4. The method 900 then selects a next instruction along a path away from the selected output (Block 906), which in our example is the "Call" instruction. Some numerical value is assigned to the selected instruction, and this numerical value can be accumulated with all values for other instructions traversed in the basic block (Block 908). In the example, no other instructions have been addressed, so the accumulated value merely equals whatever value is assigned to the "Call" instruction. The method 900 then determines if all instructions along a path away from the selected output have been addressed, or assigned a numerical value (Decision 910). If not, then the method 900 loops back to select a next instruction on the path away from the selected output (Block 906), and the next instruction is assigned a numerical value (Block 908). This continues until all instructions in the path have been addressed (Decision 910). For the path between vr4 and vr0, all instructions have been addressed, since there is only one, so the method 900 can move past decision 910. Once all instructions in the path have been addressed (Decision 910), the method 900 determines if all inputs for the selected output have been addressed (Decision 912). If not, then the method 900 loops back and begins tracing a new path away from the selected input (Block 906). In the example, there is only one input, vr0, for the selected output, vr4, so the method 900 would move to a next output. Where a second input is available, for instance, given output vr5, which has three corresponding inputs, vr0, vr1, vr2, the method 900 would traverse the additional paths between the output and the inputs not yet addressed. Once all inputs for a given output have been addressed (Decision 912), the method determines if all outputs have been addressed (Decision 914). If not, then the method 900 selects a next output (Block 902) and begins accumulating numerical values for instructions found along one or more paths away from the selected output. Once all outputs have been addressed (Decision 914), the accumulated numerical value can be considered the semantic fingerprint for the basic block and can be provided to a consumer of semantic fingerprints (Block 916), or used to generate a semantic fingerprint for a larger segment of code, such as a region or a function.

Some instructions, such as calls of functions with a 'void' return type or stores to memory, do not produce an output but can have important side-effects, such as modifying memory. So, these instructions, that do not produce real outputs, are to be accounted for in the fingerprint. Since the method is based on following paths from "outputs" backwards, the side-effects of instructions that do not have real outputs are modeled as "virtual" outputs from the instructions. In this way, the method can walk backwards from an output or a virtual output toward an input. Consider for example the Call instruction in FIG. 8. The function called by this instruction has a 'void' return type (e.g., it does not return a value that is used by subsequent instructions inside or outside the basic block). To include this instruction in the fingerprint of the basic block, we assume for the purpose of the algorithm that this call instruction produces a virtual output (vr4). We can then treat this virtual output like any other output of the basic block and traverse the paths backwards from this output to the inputs of the basic block, in this case vr0, and calculate a fingerprint value that can then be accumulated into the basic block's fingerprint.

In some embodiments, the semantic fingerprints can also take into account a data type of the inputs. In particular, given the accumulation of numerical values determined by method 900, the data types of the inputs can be assigned numerical values, and these one or more values can be accumulated with the accumulated numerical value for the rest of the basic block. The result is a semantic fingerprint that takes the input data types into account. For instance the semantic fingerprint can distinguish between inputs that are integers, floating point numbers, structures, etc., by assigning different numerical values to different input types.

A similar process occurs for determining a semantic fingerprint for regions, except that the flow of the control flow graph is also considered. FIG. 10 illustrates a block diagram of control flow graphs 1000A and 1000B for two different regions of code, Region A and Region B. These are similar but not identical regions, with the lone difference being Region B's basic block 1010 and the control flow from the basic block 1004 to the basic block 1010. A semantic fingerprint for a region looks first at an accumulation of the semantic fingerprints for all basic blocks in the region, and then accumulates these with numerical values assigned to the control flow of the region between basic blocks. The semantic fingerprint for the region can be an accumulation of the semantic fingerprints of the basic blocks as well as numerical values representing the control flow therebetween. For example, the difference between the fingerprints for RegionA and RegionB would be a value representative of the basic block 1010 and the control flow from basic block 1004 to the basic block 1010.

Figure 11:
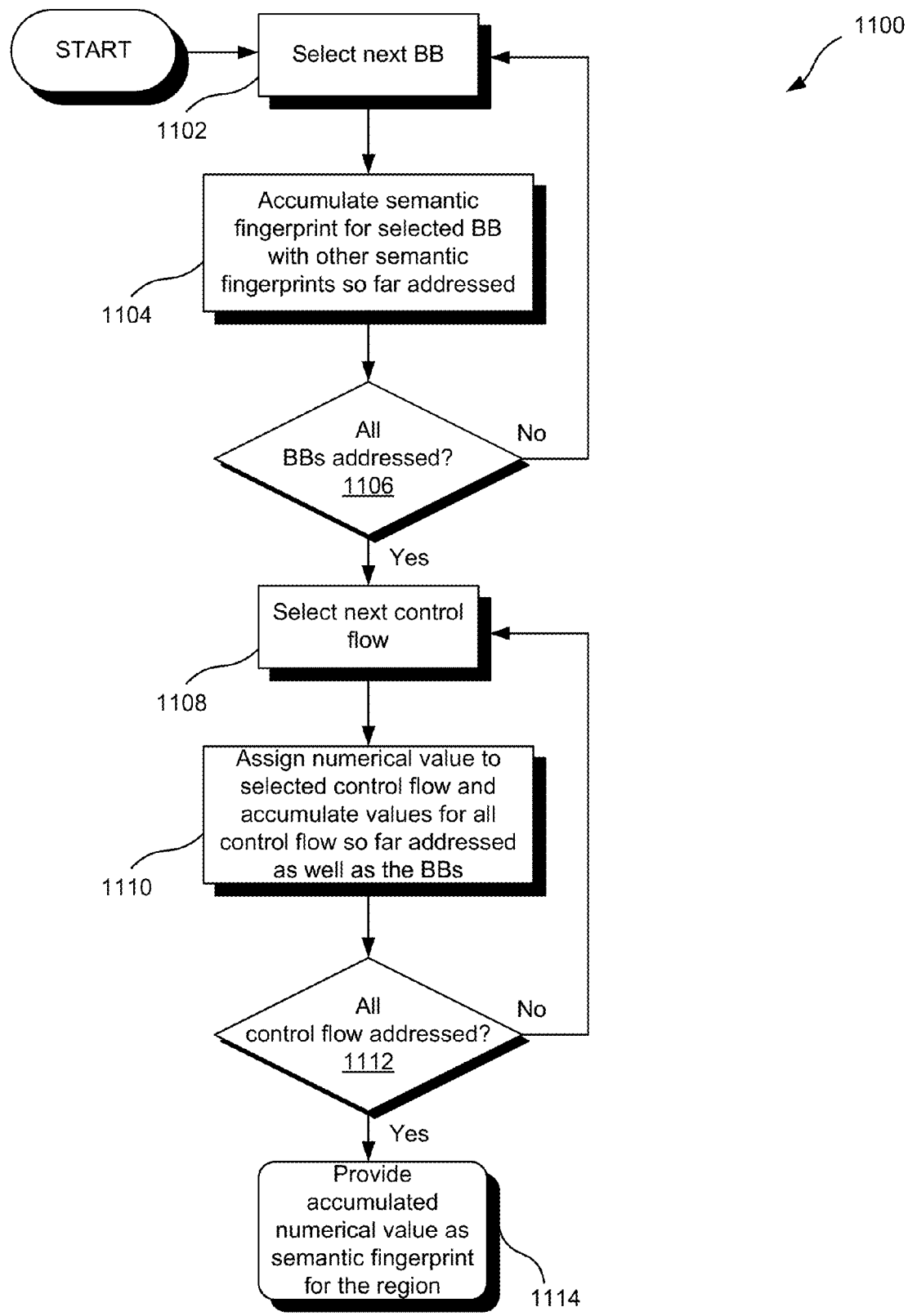
FIG. 11 illustrates a method for determining a semantic fingerprint for a region.

This is detailed further in method 1100 shown in FIG. 11. To reduce the complexity and resource usage of determining semantic fingerprints for a region, the method 1100 makes use of the fact that semantic fingerprints can be determined after semantic fingerprints for all basic blocks within a region are determined, and thus the region fingerprint can merely accumulate the existing semantic fingerprints for the basic blocks therein. So, the method 1100 need only accumulate the already-computed semantic fingerprints for the basic blocks in the region and then add values for the control flow. To do this, the method 1100 starts by selecting a first basic block in the region (Block 1102), where any basic block can be selected first. The method 1100 then accumulates the semantic fingerprint for the selected basic block with other semantic fingerprints for basic blocks already addressed (Block 1104). In the case of the first basic block, there are no other semantic fingerprints to accumulate with, so the result of Block 1104 would just be the semantic fingerprint of the first basic block. After each accumulating step (Block 1104), the method 1100 determines if semantic fingerprints for all basic blocks have been accumulated (Decision 1106). If not, then the method 1100 loops back and selects a new basic block in the region (Block 1102) and accumulates the semantic fingerprint for the newly selected basic block with the accumulated values of all prior basic blocks in the region (Block 1104). The order of accumulation is typically not critical.

When all basic blocks have been addressed (Decision 1106), the method 1100 turns to accounting for the control flow in the semantic fingerprint. A numerical value can be assigned to the selected control flow and this value can be accumulated with any prior values of other flows in the region as well as the accumulated semantic fingerprint for the basic blocks (Block 1110). If further control flow has yet to be addressed (Decision 1112), then the method 1100 can loop back and select a next control flow (Block 1108) and accumulate a numerical value for it (Block 1110). Again, the order of accumulating the control flow is typically not critical.

Once all control flows have been addressed (Decision 1112), the final accumulated value can be considered a semantic fingerprint for the region and can be provided at Block 1114.

Where merging of code will only take place at the basic block and region levels (i.e., no merging of functions), then semantic fingerprints for functions need not be determined. However, if merger of functions is expected, then FIG. 12 briefly describes how semantic fingerprints for functions are derived.

Figure 12:
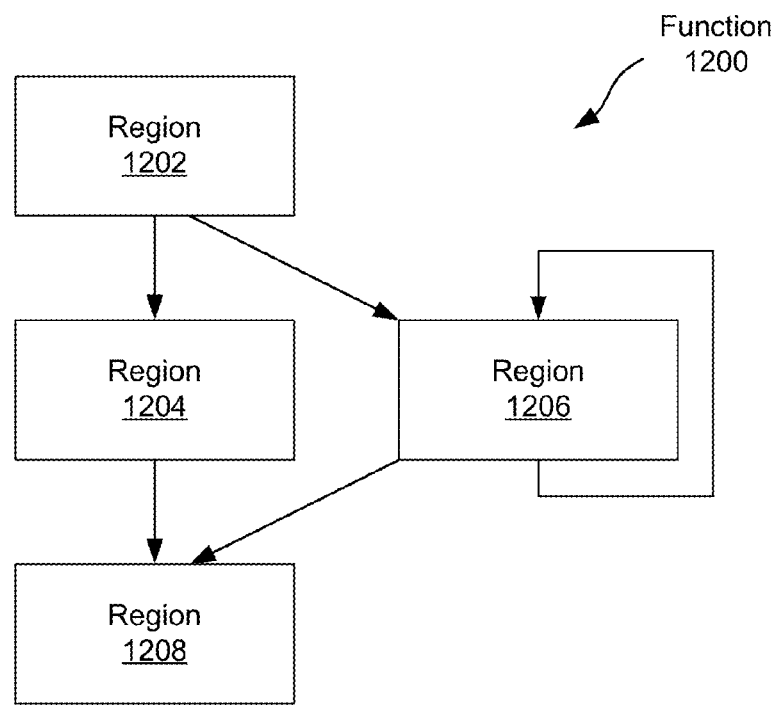
FIG. 12 illustrates an example of a control flow graph for a function, which is formed from two or more regions linked via control flow.

FIG. 12 illustrates an example of a control flow graph for a function, which is formed from two or more regions linked via control flow. Calculating a semantic fingerprint for a function is carried out in a similar fashion to that of a region. The semantic fingerprints for the regions 1202, 1204, 1206, 1208 are accumulated, and then numerical values representing the control flow between these regions 1202, 1204, 1206, 1208 is accumulated with the accumulated values for the regions 1202, 1204, 1206, 1208. The end result is a semantic fingerprint for the function 1200. In some embodiments, it may be preferable to calculate a semantic fingerprint for a function based on the semantic fingerprints for the basic blocks making up the function rather than accumulating the semantic fingerprints for the regions, but this alternative is not illustrated.

Figure 15:
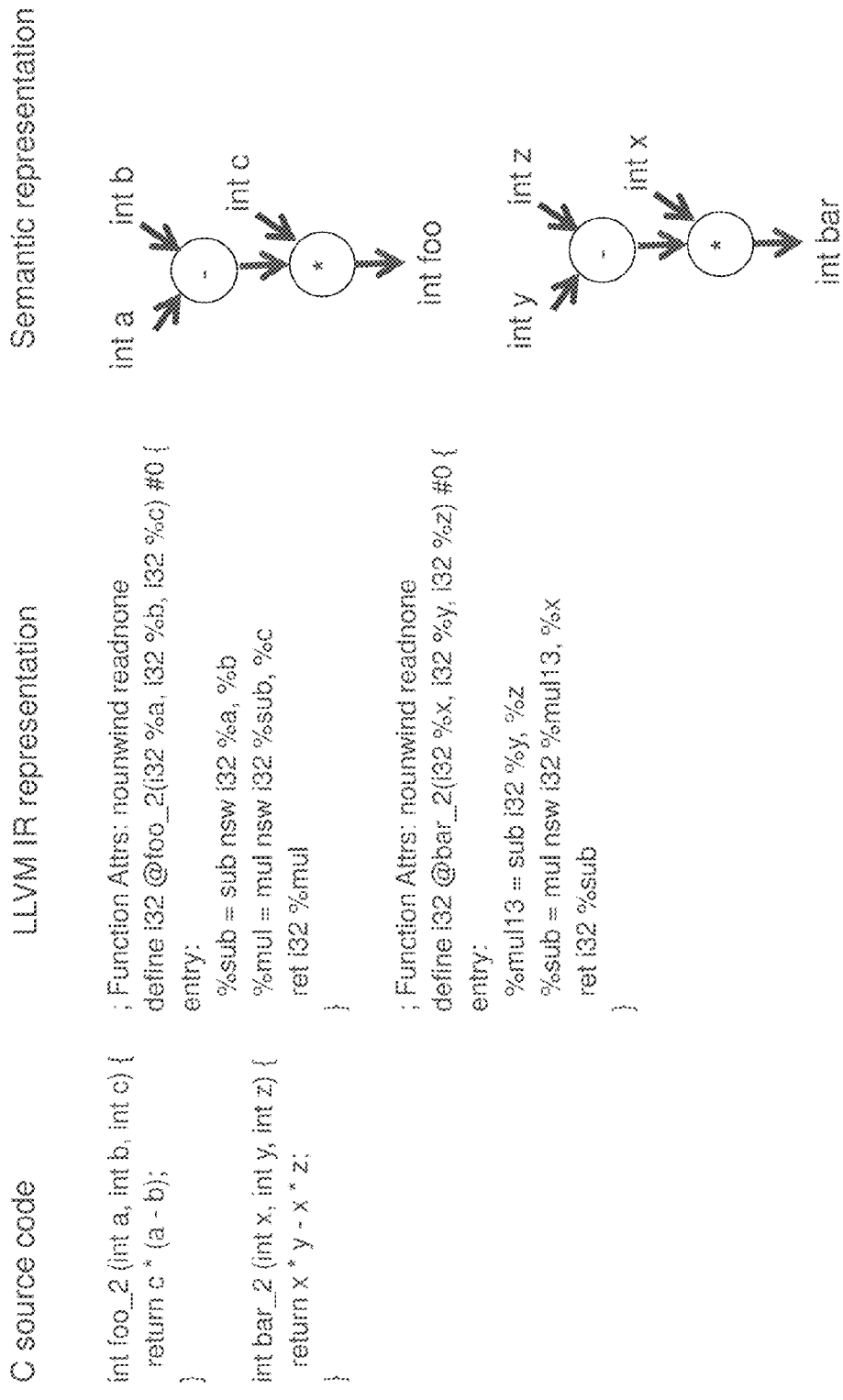
FIG. 15 depicts an example of non-trivial argument order difference between basic blocks.

FIGS. 13-15 depict examples of different similarities between functions that can be captured by the semantic fingerprints. In particular, these examples show full semantic equivalence, argument order difference, and non-trivial order difference. Each example shows a portion of source code in C, then the LLVM intermediate representation of the source code, and finally a semantic representation of the intermediate representation. These three examples show similar functions "foo" and "bar" where each example shows a different type of similarity between "foo" and "bar." For instance, in FIG. 13, the variables or arguments that both functions use (e.g., "a," "b," and "c" versus "x," "y," and "z") are different, as are the equations (e.g., "c*(a+b)" versus "z*x+z*y), yet if a=x, b=y, and c=z, the two functions will result in the same answer or output. In other words, they are functionally or semantically equivalent. Because of this, the semantic fingerprints assigned to "foo" and "bar" in FIG. 13 would likely be the same, and during clustering, "foo" and "bar" would be grouped into the same cluster and merged.

FIG. 14, shows another two variations of "foo" and "bar" where the arguments are different, the equations are different, and the order that the arguments are used in the equations is different. However, like the example in FIG. 13, the function of "foo" and "bar" in FIG. 14 is likely to be the same, and thus any fingerprints for "foo" and "bar" in this example would likely be very similar, although not identical.

In comparison, FIG. 15 shows an example of two functions "foo" and "bar" where the differences in the argument order can cause different functionality between the two functions. In particular, since the equations in "foo" and "bar" both use subtraction, the order of operations is no longer trivial, and as a result, the outcomes of both functions are not semantically equivalent. In this case, the semantic fingerprints for "foo" and "bar" are likely to be more dissimilar than in the example of FIG. 14, and clearly dissimilar as compared to the example of FIG. 13. Further, because of this difference in semantic fingerprints, "foo" and "bar" in this example are unlikely to be clustered during merging unless the user sets a very large similarity criterion.

FIG. 19 illustrates an example of two functions that are nearly the same. The lone difference between these two functions is the function called inside the loop (i.e., "scaler (kid)" versus "list(kid)"). This is one example of a function that is ripe for merger.

FIG. 20 illustrates some examples of functions and one set of semantic fingerprints corresponding to each function. In particular, the functions "Perl_scalarkids" and "Perl_list-kids" from the Example of FIG. 19 have been assigned the semantic fingerprints, 125 and 127, respectively, while other functions have been assigned the semantic fingerprints 2839, 2838, 2840, and 20. Immediately, one notes that the semantic fingerprints for the functions "Perl_scalarkids" and "Perl_listkids" are closer to each other than any of the other semantic fingerprints, and this reflects the fact that these functions are highly similar, as seen in FIG. 19. However, one also notes that the three functions "Perl_otherfn1," "Perl_otherfn2," and "Perl_otherfn3" also have very similar semantic fingerprints. "Perl_otherfn4" appears to be the most different from all other functions in FIG. 20 since its semantic fingerprint is note "near" any other semantic fingerprints. The distances between these semantic fingerprints largely determines clustering, as show in FIG. 21.

Figure 21:
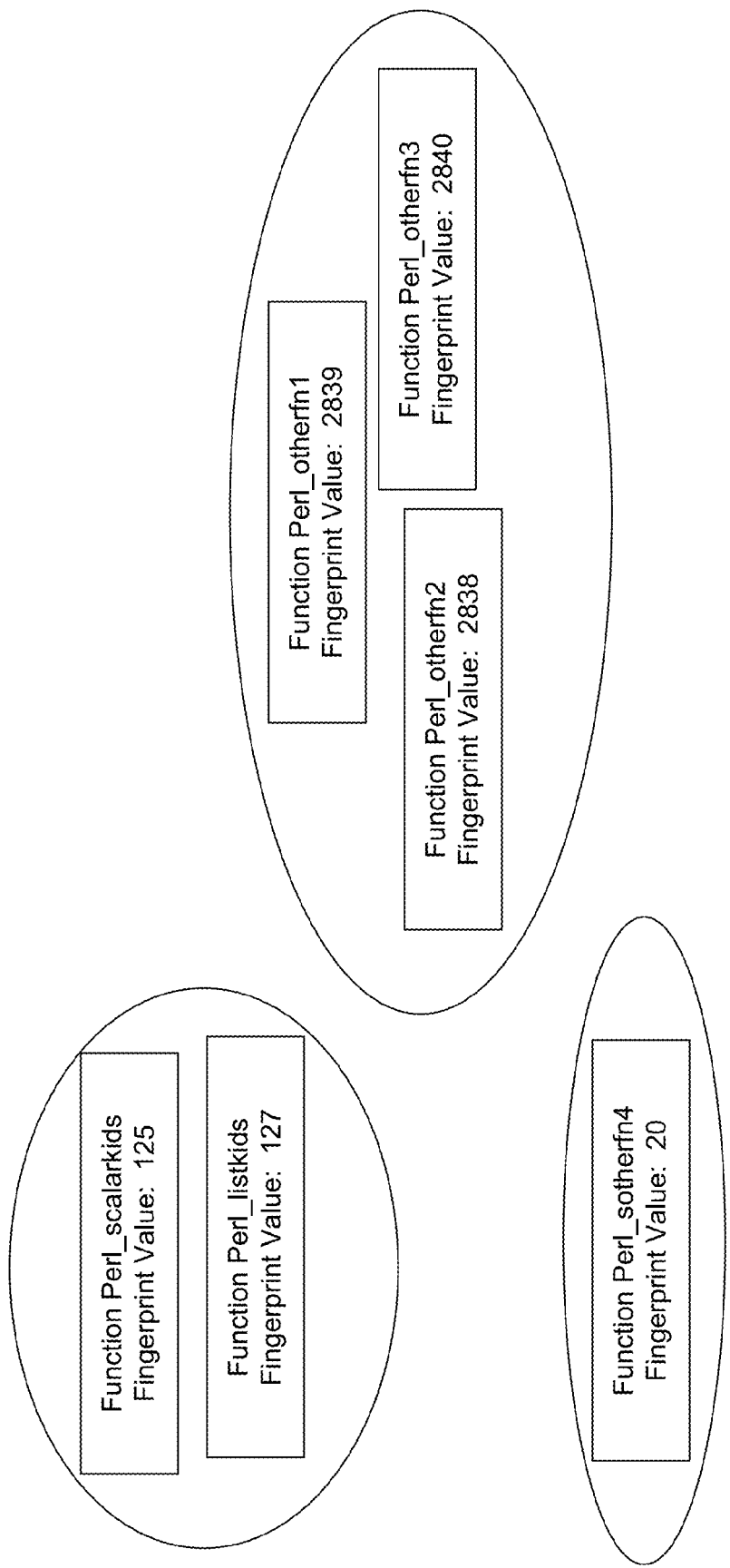
FIG. 21 illustrates an example of clustering of the functions in FIG. 20.

FIG. 21 illustrates one embodiment of clustering of the functions illustrated in FIG. 20. Here, the similarity criterion could be a distance between semantic fingerprints, such as the value 3. All functions having semantic fingerprints within 3 of each other are clustered. Each fingerprint can exist within a single cluster, so in instances where fingerprints could be put into multiple clusters, the method places such fingerprints into a largest of the available clusters. For instance, if the similarity criterion is 5, and a function has a difference of 4 from functions in two different clusters, then the function would be clustered with the larger of the two clusters.

FIG. 22 illustrates merger of the functions clustered in FIG. 21. Here one sees that the new merged function 2202 includes additional argument "int Selector", and control flow (e.g., "if . . . else") to account for differences between the original functions. At the same time, the original functions can each be replaced with a wrapper 2204, 2206 calling the new merged function 2202, where the argument (o,1), corresponding to the "int Selector" argument of the new merged function 2202, is unique to each wrapper 2204, 2206 and causes the new merged function 2202 to select a control flow resulting in the same functionality as the original function. For instance, the first wrapper 2204 uses the argument 1, which causes the new merged function 2202 to select the control flow to the "scalar(kid)" function, while the second wrapper 2206 uses the argument 2, which causes the new merged function 2202 to select the control flow to the "list(kid)" function.

As one can see, the benefits of the herein disclosed optimizations and semantic fingerprinting are to enable quantitative comparison between portions of code that have dissimilar numbers of instructions and control flow, and to reduce code size, thereby improving cache usage and behavior. Duplicate code can be eliminated or reduced while still maintaining the functions of the duplicated code. While the prior art was limited to merging similar code where the structure and number of instructions matched, the present disclosure enables merging of syntactically different, but semantically identical cases (e.g., c*(a+b) can be considered the same as z*x+x*y). While it is true that merging code does generate some additional code (e.g., the new merged code), the reduction in the size of original code portions that are merged, more than makes up for the new additional code. Said another way, in most instances, the herein disclosed systems, methods, and apparatus will generate significantly smaller binaries for source code than code optimizations known in the art.

Figure 23:
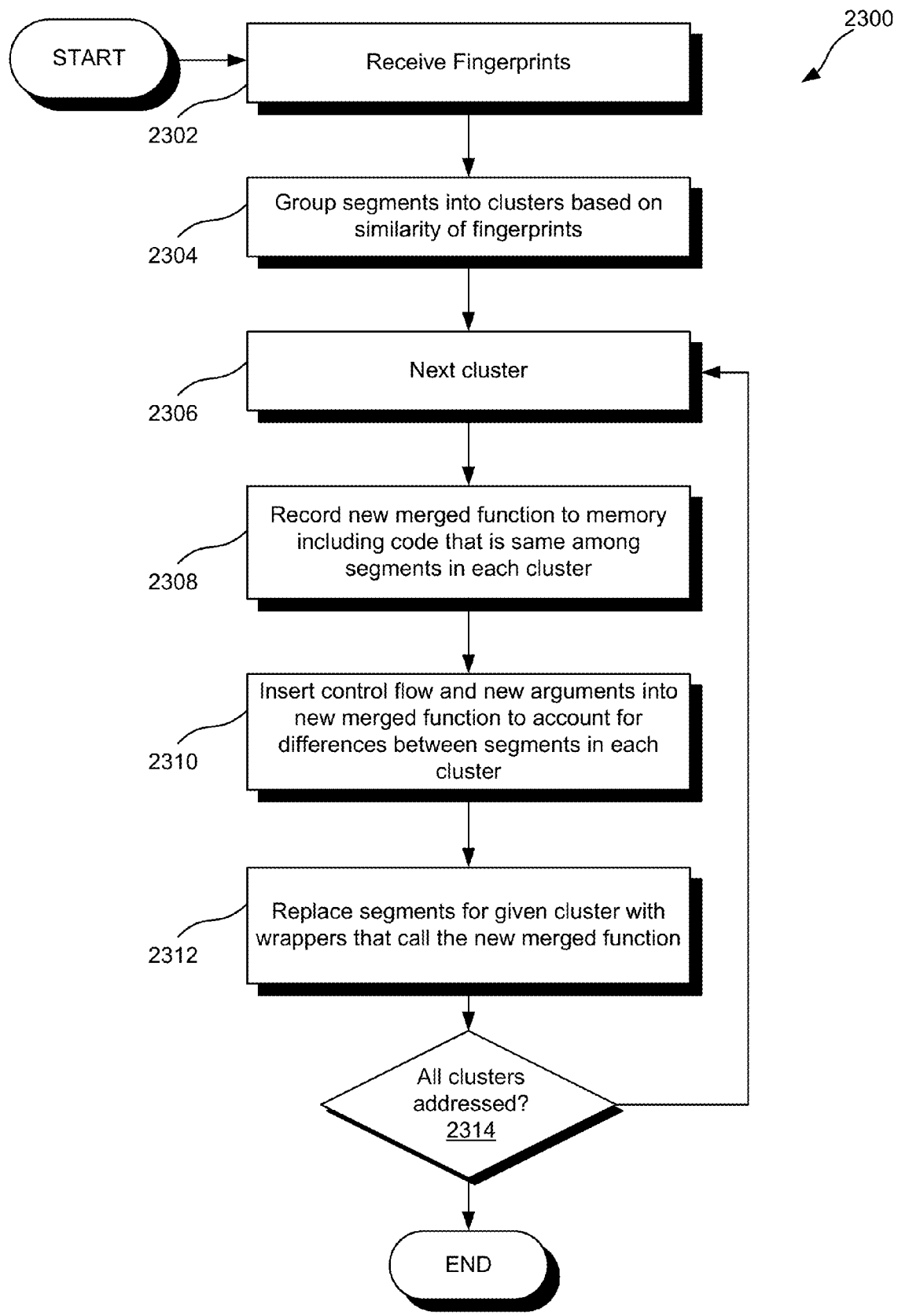
FIG. 23 illustrates a method of merging functions that have been assigned semantic fingerprints.

FIG. 23 illustrates a method of merging functions that have been assigned semantic fingerprints. The method 2300 can include receiving or accessing fingerprints (Block 2302), where the fingerprints are numerical representations or numerical approximations of segments of an intermediate representation (e.g., a basic block, a region, or a function). The method 2300 can then group the segments of the intermediate representation into clusters based on a similarity of fingerprints (Block 2304). For instance, a similarity criteria, such as a distance between fingerprints, can be used to determine which fingerprints are clustered together. The method 2300 can then address a next cluster (Block 2306), or the first cluster when the method 2300 is first entering this loop, and generate a new merged function to represent all segments in the selected cluster (Block 2308). This can include recording the merged function to memory. The merged function can comprise at least code that is the same among all segments in the cluster as well as additional flow control and new arguments that account for differences between segments of code in each cluster (Block 2310). At the same time, the original code segments being merged (all segments in the cluster), can be replaced with wrappers that call the new merged function using the new arguments that have been inserted into the new merged function (Block 2312). These operations can be repeated for each cluster until all clusters have been merged and a single new merged function formed from each cluster (Decision 2314).

Figure 16:
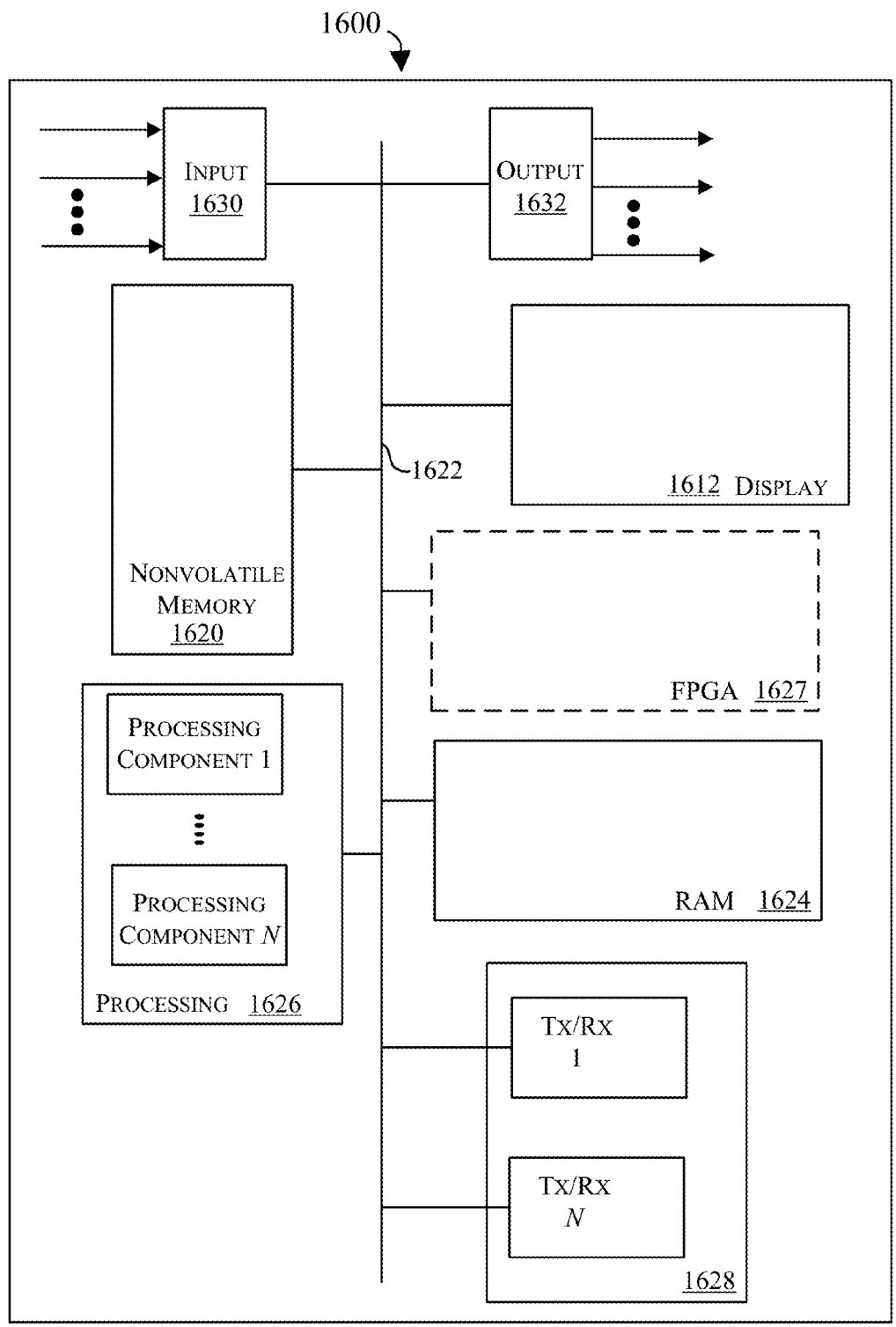
FIG. 16 illustrates a block diagram depicting physical components that may be utilized to realize the developer machine according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 16 for example, shown is a block diagram depicting physical components that may be utilized to realize the developer machine 102 (and a processor that the compiler 106 and the optimizer 114 operate on) according to an exemplary embodiment. As shown, in this embodiment a display portion 1612 and nonvolatile memory 1620 are coupled to a bus 1622 that is also coupled to random access memory ("RAM") 1624, a processing portion (which includes N processing components) 1626, an optional field programmable gate array (FPGA) 1627, and a transceiver component 1628 that includes N transceivers. Although the components depicted in FIG. 16 represent physical components, FIG. 16 is not intended to be a detailed hardware diagram; thus many of the components depicted in FIG. 16 may be realized by common constructs or distributed among additional physical components. Moreover, it is contemplated that other existing and yet-to-be developed physical components and architectures may be utilized to implement the functional components described with reference to FIG. 16.

This display portion 1612 generally operates to provide a user interface for a user, and in several implementations, the display is realized by a touchscreen display. In general, the nonvolatile memory 1620 is non-transitory memory that functions to store (e.g., persistently store) data and processor-executable code (including executable code that is associated with effectuating the methods described herein). In some embodiments for example, the nonvolatile memory 1620 includes bootloader code, operating system code, file system code, and non-transitory processor-executable code to facilitate the execution of methods described with reference to FIGS. 4-7, 9, and 11 described further herein.

In many implementations, the nonvolatile memory 1620 is realized by flash memory (e.g., NAND or ONENAND memory), but it is contemplated that other memory types may be utilized as well. Although it may be possible to execute the code from the nonvolatile memory 1620, the executable code in the nonvolatile memory is typically loaded into RAM 1624 and executed by one or more of the N processing components in the processing portion 1626.

The N processing components in connection with RAM 1624 generally operate to execute the instructions stored in nonvolatile memory 1620 to enable semantic fingerprinting of basic blocks, regions, and functions of an intermediate representation of source code. For example, non-transitory, processor-executable code to effectuate the methods described with reference to FIGS. 4-7, 9, and 11 may be persistently stored in nonvolatile memory 1620 and executed by the N processing components in connection with RAM 1624. As one of ordinarily skill in the art will appreciate, the processing portion 1626 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1626 may be configured to effectuate one or more aspects of the methodologies described herein (e.g., the methods described with reference to FIGS. 4-7, 9, and 11). For example, non-transitory processor-readable instructions may be stored in the nonvolatile memory 1620 or in RAM 1624 and when executed on the processing portion 1626, cause the processing portion 1626 to iteratively assign semantic fingerprints to portions of an intermediate representation of source code. Alternatively, non-transitory FPGA-configuration-instructions may be persistently stored in nonvolatile memory 1620 and accessed by the processing portion 1626 (e.g., during boot up) to configure the hardware-configurable portions of the processing portion 1626 to effectuate the functions of the compiler 106.

The input component 1630 operates to receive signals (e.g., the source code 104 or the intermediate representation of the source code 104) that are indicative of one or more aspects of the source code. The output component generally operates to provide one or more analog or digital signals to effectuate an operational aspect of the compiler 106. For example, the output portion 1632 may provide the executable 108 described with reference to FIG. 1.

The depicted transceiver component 1628 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

As will be appreciated by one skilled in the art, aspects of the present invention may be embodied as a system, method or computer program product. Accordingly, aspects of the present invention may take the form of a hardware embodiment, a software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A non-transitory, tangible computer readable storage medium, encoded with processor readable instructions to perform a method for reducing duplicated code during compiling of source code, the method comprising:
   receiving a plurality of fingerprints each associated with one of a plurality of segments of an intermediate representation of the source code;
   grouping the plurality of segments of the intermediate representation into clusters based on a similarity of the fingerprints such that each cluster comprises segments of the intermediate representation that are substantially the same;
   for each cluster, recording a new merged function to a memory, the merged function including code that is the same among all segments of the intermediate representation for a given cluster;
   inserting control flow and new arguments into the new merged function to handle differences between the segments of the intermediate representation in the given cluster; and
   replacing the segments of the intermediate representation for the given cluster with wrappers that call the new merged function using the new arguments.

2. The non-transitory, tangible computer readable storage medium of claim 1, further comprising re-assigning fingerprints to basic blocks that have been replaced by wrappers and re-assigning region fingerprints to regions whose basic blocks have been replaced by the wrappers.

3. The non-transitory, tangible computer readable storage medium of claim 1, further comprising iteratively re-assigning fingerprints to the segments of the intermediate representation to form re-assigned fingerprints, and then performing further merging of the segments of the intermediate representation based on the re-assigned fingerprints.

4. The non-transitory, tangible computer readable storage medium of claim 3, further comprising providing the re-assigned fingerprints to one of the following:
   one or more code optimizing modules configured to merge redundant and similar portions of the intermediate representation;
   a back end configured to transform the intermediate representation to machine code or assembly code;
   a copyright violation identification module that compares the re-assigned fingerprints to fingerprints of copyrighted code; and
   a virus or malware identification module that compares the re-assigned fingerprints to fingerprints of intermediate representations of known virus or malware code.

5. The non-transitory, tangible computer readable storage medium of claim 1, wherein the segment of the intermediate representation is a basic block, a region, or a function.

6. The non-transitory, tangible computer readable storage medium of claim 1, wherein the wrappers include one or more arguments from the segments of the intermediate representation.

7. A system comprising:
a processing portion with one or more processing components therein;
a memory coupled to the processing portion and configured to store source code and a corresponding executable code;
a compiler stored on the memory and executable on the processing portion to:
receive a plurality of fingerprints each associated with one of a plurality of segments of an intermediate representation of the source code;
group the plurality of segments of the intermediate representation into clusters based on a similarity of the fingerprints such that each cluster comprises segments of the intermediate representation that are substantially the same;
for each cluster, record a new merged function to the memory, the merged function including code that is the same among all segments of the intermediate representation for a given cluster;
insert control flow and new arguments into the new merged function to handle differences between the segments of the intermediate representation in the given cluster; and
replace the segments of the intermediate representation for the given cluster with wrappers that call the new merged function using the new arguments.

8. The system of claim 7, further comprising re-assigning fingerprints to basic blocks that have been replaced by wrappers and re-assigning region fingerprints to regions whose basic blocks have been replaced by wrappers.

9. The system of claim 7, further comprising iteratively re-assigning fingerprints to the segments of the intermediate representation to form re-assigned fingerprints and then performing further merging of the segments of the intermediate representation based on the re-assigned fingerprints.

10. The system of claim 9, further comprising providing the re-assigned fingerprints to one of the following:
one or more code optimizing modules configured to merge redundant and similar portions of the intermediate representation;
a back end configured to transform the intermediate representation to machine code or assembly code;
a copyright violation identification module that compares the re-assigned fingerprints to fingerprints of copyrighted code; and
a virus or malware identification module that compares the re-assigned fingerprints to fingerprints of intermediate representations of known virus or malware code.

11. The system of claim 7, wherein the segment of the intermediate representation is a basic block, a region, or a function.

12. The system of claim 7, wherein the wrappers include one or more arguments from the segments of the intermediate representation.

13. A method comprising:
receiving a plurality of fingerprints each associated with one of a plurality of segments of an intermediate representation of the source code;
grouping the plurality of segments of the intermediate representation into clusters based on a similarity of the fingerprints such that each cluster comprises segments of the intermediate representation that are substantially the same;
for each cluster, recording a new merged function to a memory, the merged function including code that is the same among all segments of the intermediate representation for a given cluster;
inserting control flow and new arguments into the new merged function to handle differences between the segments of the intermediate representation in the given cluster; and
replacing the segments of the intermediate representation for the given cluster with wrappers that call the new merged function using the new arguments.

14. The method of claim 13, further comprising for re-assigning fingerprints to basic blocks that have been replaced by wrappers and re-assigning region fingerprints to regions whose basic blocks have been replaced by wrappers.

15. The method of claim 13, further comprising for iteratively re-assigning fingerprints to the segments of the intermediate representation to form re-assigned fingerprints and then performing further merging of the segments of the intermediate representation based on the re-assigned fingerprints.

16. The method of claim 15, further comprising for providing the re-assigned fingerprints to one of the following:
one or more code optimizing modules configured to merge redundant and similar portions of the intermediate representation;
a back end configured to transform the intermediate representation to machine code or assembly code;
a copyright violation identification module that compares the re-assigned fingerprints to fingerprints of copyrighted code; and
a virus or malware identification module that compares the re-assigned fingerprints to fingerprints of intermediate representations of known virus or malware code.

17. The method of claim 13, wherein the segment of the intermediate representation is a basic block, a region, or a function.

18. The method of claim 13, wherein the wrappers include one or more arguments from the segments of the intermediate representation.

* * * * *